US006751370B2

United States Patent
Avakian et al.

(10) Patent No.: US 6,751,370 B2
(45) Date of Patent: Jun. 15, 2004

(54) METHOD OF ALIGNING A DRIVING FORCE WITH RESPECT TO A MOVABLE ELEMENT USING MECHANICAL RESONANCE

(75) Inventors: Aramais Avakian, Pasadena, CA (US); Thomas Tsao, Monterey Park, CA (US)

(73) Assignee: UMachines, Inc., Pasadena, CA (US)

( * ) Notice: Subject to any disclaimer, the term of this patent is extended or adjusted under 35 U.S.C. 154(b) by 0 days.

(21) Appl. No.: 10/101,514
(22) Filed: Mar. 18, 2002

(65) Prior Publication Data

US 2003/0174932 A1 Sep. 18, 2003

(51) Int. Cl.[7] .................................................. G02B 6/42
(52) U.S. Cl. .............................. 385/18; 385/19; 385/17
(58) Field of Search ........................ 385/16–22; 359/318

(56) References Cited

U.S. PATENT DOCUMENTS

| 5,767,666 A | 6/1998 | Asada et al. ............ 359/198 X |
| 5,969,465 A | 10/1999 | Neukermans et al. ... 359/199 X |
| 6,587,612 B1 * | 7/2003 | Mitchell et al. ............... 385/18 |
| 6,639,713 B2 * | 10/2003 | Chiu et al. ................... 359/318 |

* cited by examiner

*Primary Examiner*—Phan T. H. Palmer
(74) *Attorney, Agent, or Firm*—Knobbe, Martens, Olson & Bear, LLP

(57) ABSTRACT

A method reduces movement of a reflector in an unintended mechanical mode during movement of the reflector in an intended mechanical mode. The method includes using a reflector driver to apply a distribution of forces to the reflector so as to move the reflector in both the intended mechanical mode and in the unintended mechanical mode. The distribution of forces is applied at a resonant frequency of the unintended mechanical mode. The method further includes adjusting the reflector driver to alter the distribution of forces applied to the reflector such that the movement of the reflector in the unintended mechanical mode is reduced.

19 Claims, 39 Drawing Sheets

METHOD OF ALIGNING A DRIVING FORCE WITH RESPECT TO A MOVABLE ELEMENT USING MECHANICAL RESONANCE

BACKGROUND OF THE INVENTION

1. Field of the Invention

The present invention is directed to a method for aligning reflectors subjected to a driving force, and more specifically, for aligning micromachined optical switches.

2. Description of the Related Art

Optical switches are devices that can selectively switch optical signals from one optical circuit to another, and are typically used in optical systems such as optical add/drop multiplexers (OADMs). Various technologies can be used in optical switches, including, but not limited to, physically shifting an optical fiber to drive one or more alternative fibers, physically moving a reflective element, using electro-optic effects, or using magneto-optic effects.

For an optical switch to work effectively, proper alignment of the switch is desirable. In the case of optical switches that operate based on the physical movement of one or more reflective elements subjected to a driving force, misalignment of the reflective elements with respect to the optical signal being switched can cause the optical signal to switch improperly, or to fail to switch entirely. For example, a reflective element designed to move in an intended mechanical mode may also move in an unintended mode if the driving force is applied improperly. Motion of the reflective element in an unintended mode can cause the optical signal leaving the switch to reach only a portion of the detector or fiber receiving the optical signal from the switch, thereby introducing losses into the optical circuit, and causing the optical switch to attenuate the optical signal.

Misalignment of reflective elements in an optical switch may be caused by a variety of factors. In addition to external forces to which the optical switch may be subjected, environmental factors such as extreme temperatures or pressures can cause misalignment. Moreover, misalignment may occur if the reflective elements are subjected to driving forces that physically move the reflective elements in and out of the path of the optical signal. Thus, it is desirable to develop a method for aligning the reflective element of an optical switch so that when a driving force is applied, the reflective element moves in only the intended mode.

SUMMARY OF THE INVENTION

According to one aspect of the present invention, a method reduces movement of a reflector in an unintended mechanical mode during movement of the reflector in an intended mechanical mode. The method comprises using a reflector driver to apply a distribution of forces to the reflector so as to move the reflector both in the intended mechanical mode and in the unintended mechanical mode. The distribution of forces is applied at a resonant frequency of the unintended mechanical mode. The method further comprises adjusting the reflector driver to alter the distribution of forces applied to the reflector such that the movement of the reflector in the unintended mechanical mode is reduced.

According to another aspect of the present invention, a device measures a direction of a component of a magnetic field. The device comprises a mechanical system positionable in the magnetic field. The mechanical system comprises a substrate and a flap that is mechanically coupled to the substrate and that has a mechanical resonance mode with a resonance frequency. The mechanical system further comprises a reflector coupled to the flap, and an electrical conduit formed on the flap to allow an electrical current flowing through the electrical conduit to interact with the magnetic field to apply a driving force to the flap. The device further comprises an electrical current source coupled to the electrical conduit. The electrical current source is adapted to generate an electrical current with a time-dependent component with a frequency substantially equal to the resonance frequency. The device further comprises a light source adapted to generate a collimated light beam incident on the reflector, with the reflector reflecting at least a portion of the collimated light beam. The device further comprises a detector adapted to detect a displacement of the reflected portion of the collimated light beam.

DETAILED DESCRIPTION OF THE PREFERRED EMBODIMENT

Figure 2:
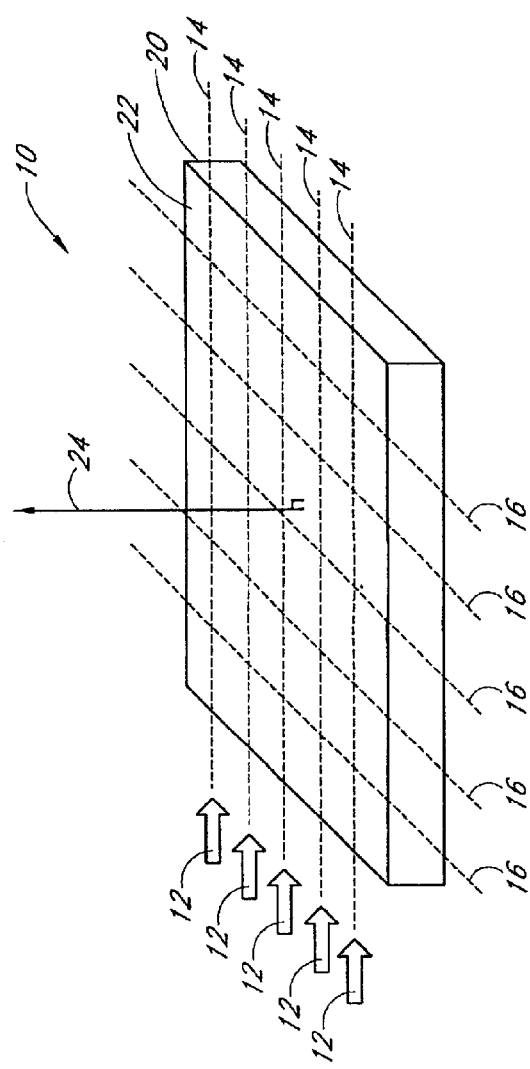
FIGS. 1 and 2 schematically illustrate an apparatus for at least partially intercepting a plurality of light beams propagating along a respective plurality of beam paths in accordance with an embodiment of the present invention.
Figure 1:
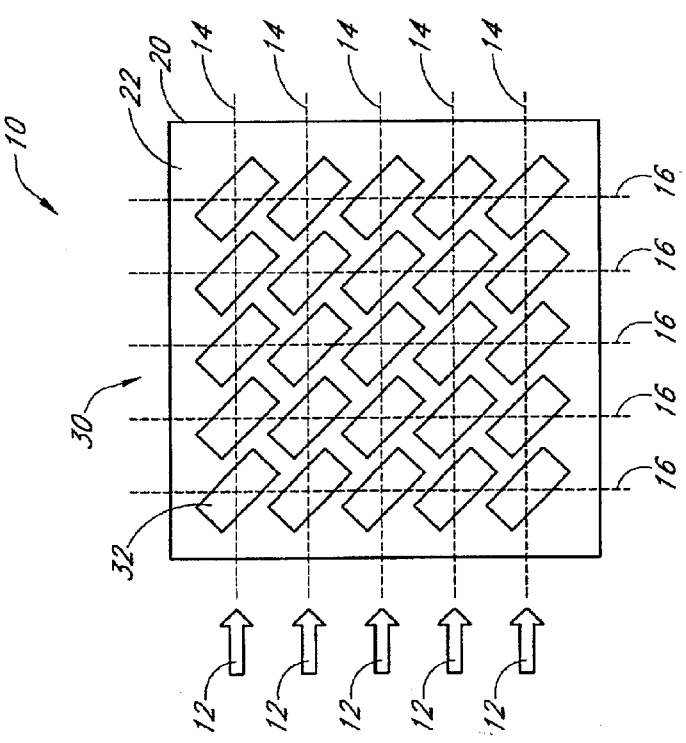

FIGS. 1 and 2 schematically illustrate an apparatus 10 for at least partially intercepting a plurality of light beams 12 propagating along a respective plurality of beam paths 14 in accordance with an embodiment of the present invention. The apparatus 10 comprises a single crystal silicon substrate 20 comprising a substrate surface 22 with a surface normal direction 24. The apparatus 10 further comprises an array 30 comprising a plurality of modules 32.

Figure 3:
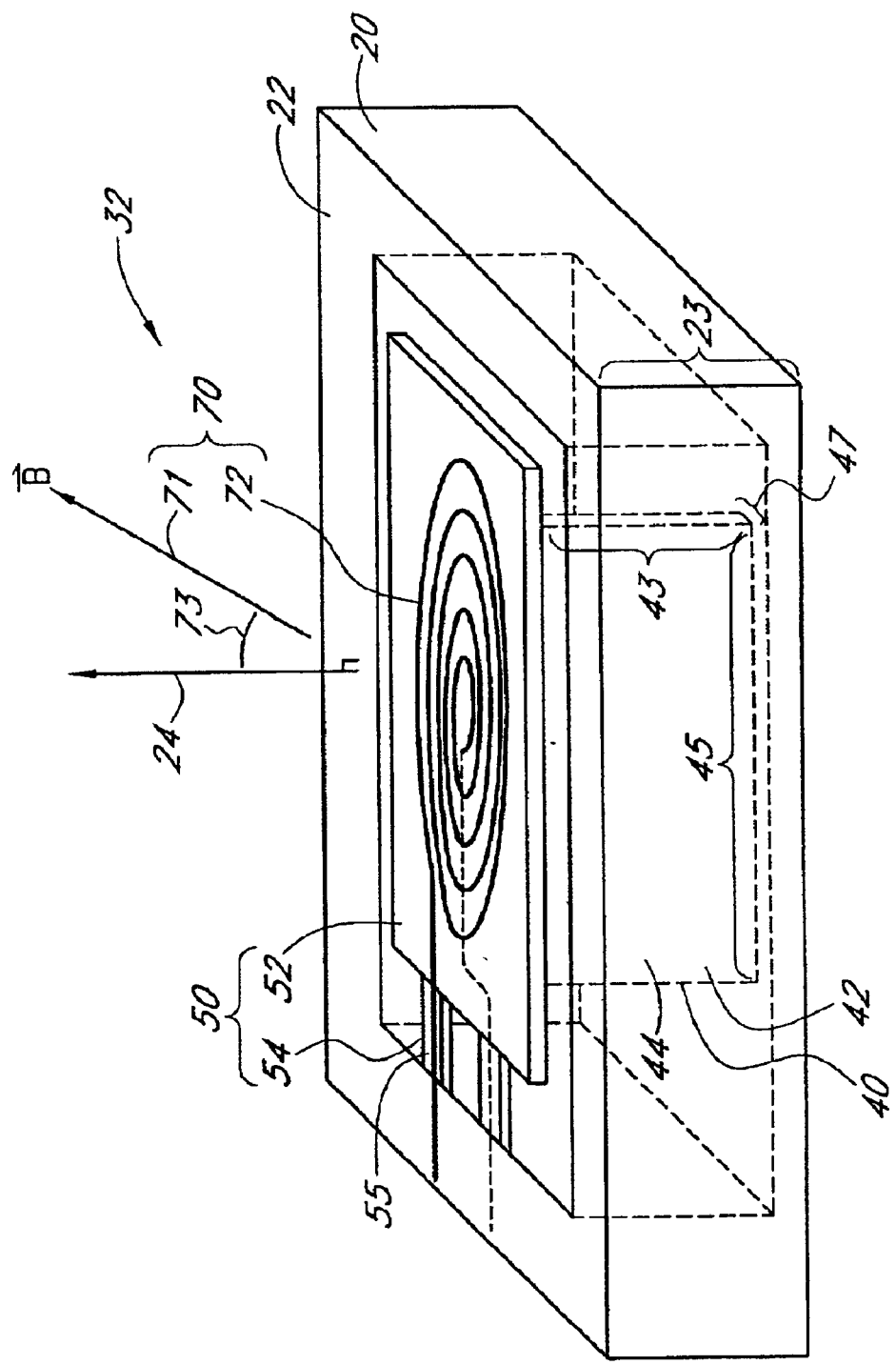
FIGS. 3 and 4 schematically illustrate a module for at least partially intercepting a light beam propagating along a beam path in accordance with an embodiment of the present invention.
Figure 4:
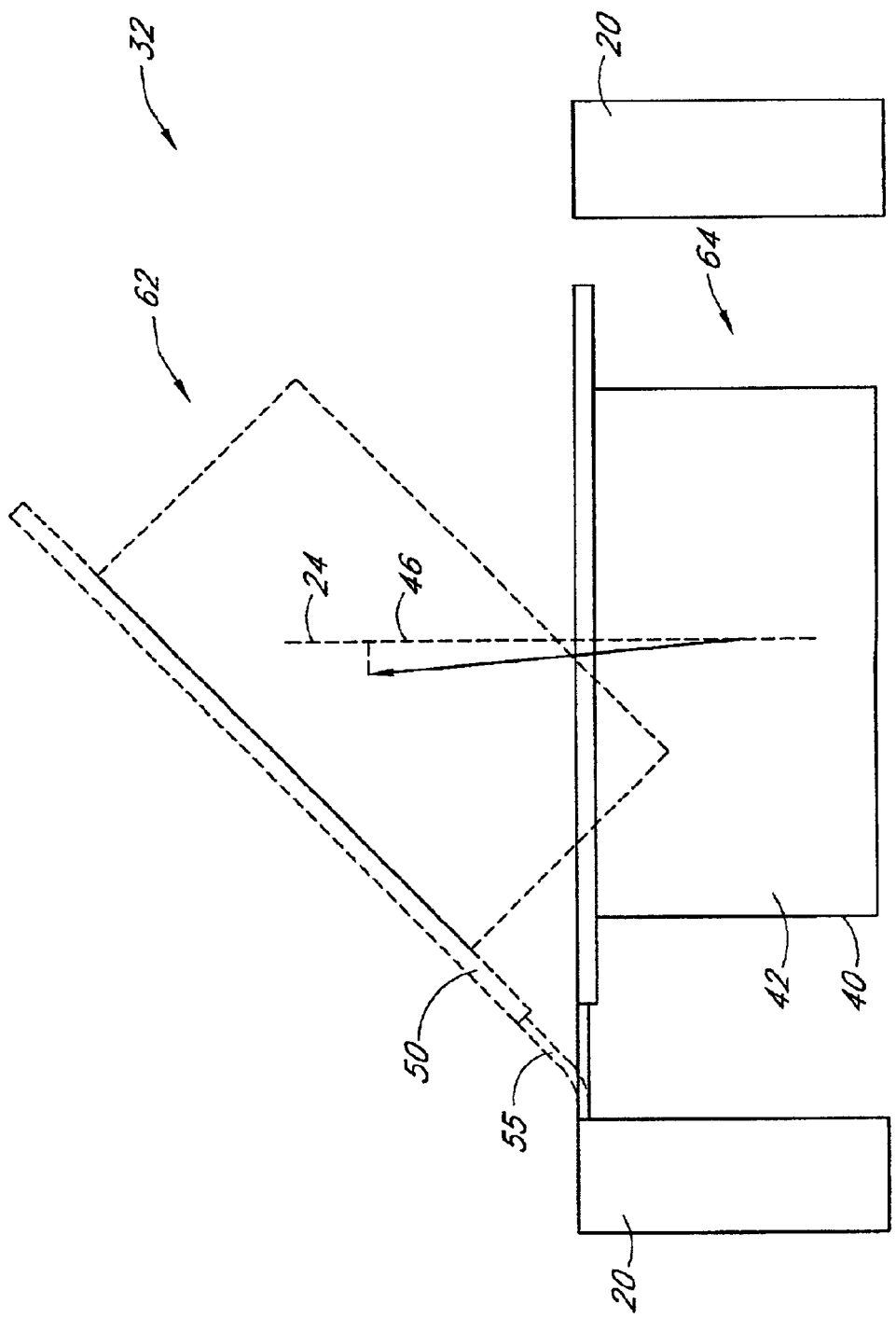

Each of the modules 32, schematically illustrated in FIGS. 3 and 4, comprises a reflector 40 comprising single crystal silicon and a reflector surface 42 lying in a reflector plane 44 substantially perpendicular to the substrate surface 22. Each of the modules 32 further comprises a reflector support 50 which mounts the reflector 40 to move substantially within the reflector plane 44 with a displacement component 46 along the surface normal direction 24 of the substrate surface 22. Each of the modules 32 further comprises a reflector driver 60 responsive to electrical current to selectively move the reflector 40 between a first position 62 in which the reflector 44 intercepts at least a portion of one of the beam paths 14 and a second position 64 in which the reflector 44 does not intercept the portion of one of the beam paths 14. At least a portion of the reflector driver 60 is mounted to the reflector support 50 and is conductive to electrical current. The reflector 40 moves to the first position 62 when electrical current flows therethrough and moves to the second position 64 when electrical current flow ceases, whereby the movement of the reflectors 40 is individually addressable.

In certain embodiments, the wavelengths of the plurality of light beams 12 are in the visible portion of the electromagnetic spectrum, typically between approximately 400 nm and approximately 800 nm. In alternative embodiments, wavelengths of the plurality of light beams 12 are in the infrared portion of the electromagnetic spectrum, between approximately 1200 nm and approximately 1600 nm. In addition, in certain embodiments, the light beams 12 are polarized, while in certain other embodiments, the light beams 12 are unpolarized. Persons skilled in the art are able to select appropriate wavelengths and polarizations of the light beams 12 in accordance with embodiments of the present invention.

The plurality of light beams 12 propagate along a respective plurality of beam paths 14. In the embodiment schematically illustrated in FIGS. 1 and 2, the beam paths 14 are substantially parallel to the substrate surface 22 and are substantially parallel to one another. Furthermore, the beam paths 14 are spaced from the substrate surface 22 in the direction of the surface normal 24 such that the light beam 12 is not occluded by the substrate 20. The beam paths 14 are spaced from one another such that each module 32 is below only one of the beam paths 14. The beam paths 14 are separated from one another by a distance of preferably between approximately 0.3 mm to approximately 10 mm, more preferably between approximately 0.75 mm to approximately 4 mm, and most preferably between approximately 1 mm to approximately 2 mm. In other embodiments, the beam paths 14 can be spaced from the substrate surface 22 in the direction opposite to the surface normal 24. In such embodiments, the beam paths 14 can be within the substrate 20 or can be below the substrate 20. Persons skilled in the art can configure the beam paths 14 in accordance with embodiments of the present invention.

In the embodiment schematically illustrated in FIGS. 1 and 2, which is configured for optical switching, the second beam paths 16 are also substantially parallel to the substrate surface 22, and substantially parallel to one another. In addition, the second beam paths 16 intersect the beam paths 14 and are co-planar with the beam paths 14. As described more fully below, in embodiments in which the reflector planes 44 are oriented at approximately 45° to the beam paths 14, the second beam paths 16 are substantially perpendicular to the beam paths 14. Furthermore, the second beam paths 16 are spaced from one another such that each module 32 is below only one of the second beam paths 16. The second beam paths 16 are separated from one another by a distance of preferably between approximately 0.3 mm to approximately 10 mm, more preferably between approximately 0.75 mm to approximately 4 mm, and most preferably between approximately 1 mm to approximately 2 mm.

The single crystal silicon substrate 20 comprises a substrate surface 22 with a surface normal direction 24. In certain embodiments, the single crystal silicon substrate 20 comprises a portion of a single crystal silicon wafer, the wafer having a thickness preferably between approximately 10 μm and approximately 1000 μm, more preferably between approximately 200 μm and approximately 800 μm, and most preferably between approximately 400 μm and approximately 600 μm. In certain embodiments, the substrate surface 22 has a {110} crystallographic orientation. In certain other embodiments, the substrate surface 22 has a {100} crystallographic orientation. More generally, in other embodiments, the substrate surface 22 comprises at least one plateau surface region, with each plateau surface region having a {110} or {100} crystallographic orientation. As used herein, the surface normal direction 24 is defined as the perpendicular direction away from the substrate surface 22. In certain embodiments, the substrate 20 also has a second substrate surface 25 which is generally parallel to the substrate surface 22. Persons skilled in the art are able to provide a single crystal silicon substrate 20 with a substrate surface 22 having a surface normal direction 24 in accordance with embodiments of the present invention.

The apparatus 10 of the embodiment schematically illustrated in FIGS. 1 and 2 has a (5×5) array 30 comprising twenty-five modules 32 to at least partially intercept five light beams 12 or channels. Each module 32 is positioned below the intersection of one of the beam paths 14 and one of the second beam paths 16. The array 30 is oriented so that the rows and columns of modules 32 are positioned along the beam paths 14 and second beam paths 16. This embodiment, which has five modules 32 for each light beam 12, can switch at least a portion of the light beam 12 from the beam path 14 to five separate second beam paths 16. More generally, similar configurations of (M×N) modules 32 can be utilized to switch light beams 12 from M beam paths 14 to N second beam paths 16, where M and N are integers which, in various embodiments, range from 1 to 64. Furthermore as described more fully below, the reflector 40 of each module 32 of the embodiment schematically illustrated in FIGS. 1 and 2 is oriented at 45° with respect to the beam path 14, which is particularly conducive to operating as an optical add/drop multiplexer (OADM).

Figure 5A:
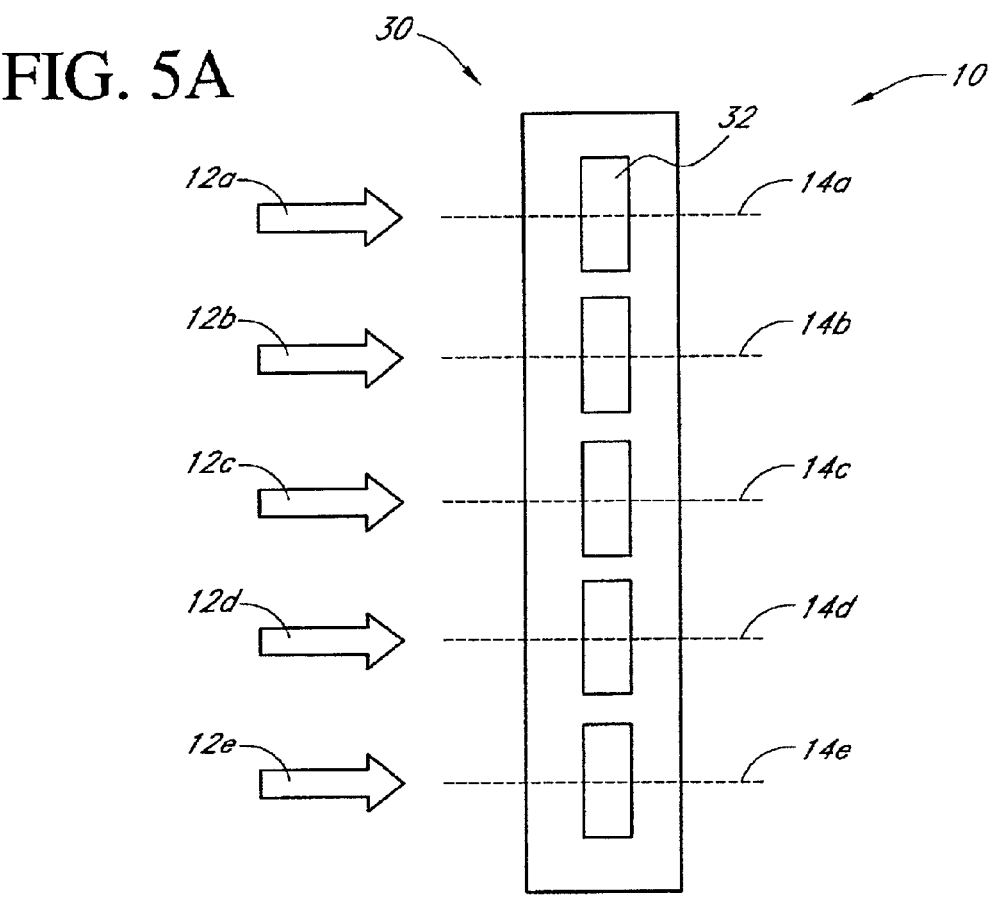
FIGS. 5A and 5B schematically illustrate an embodiment of the apparatus in which only attenuation, and not switching is warranted.
Figure 5B:
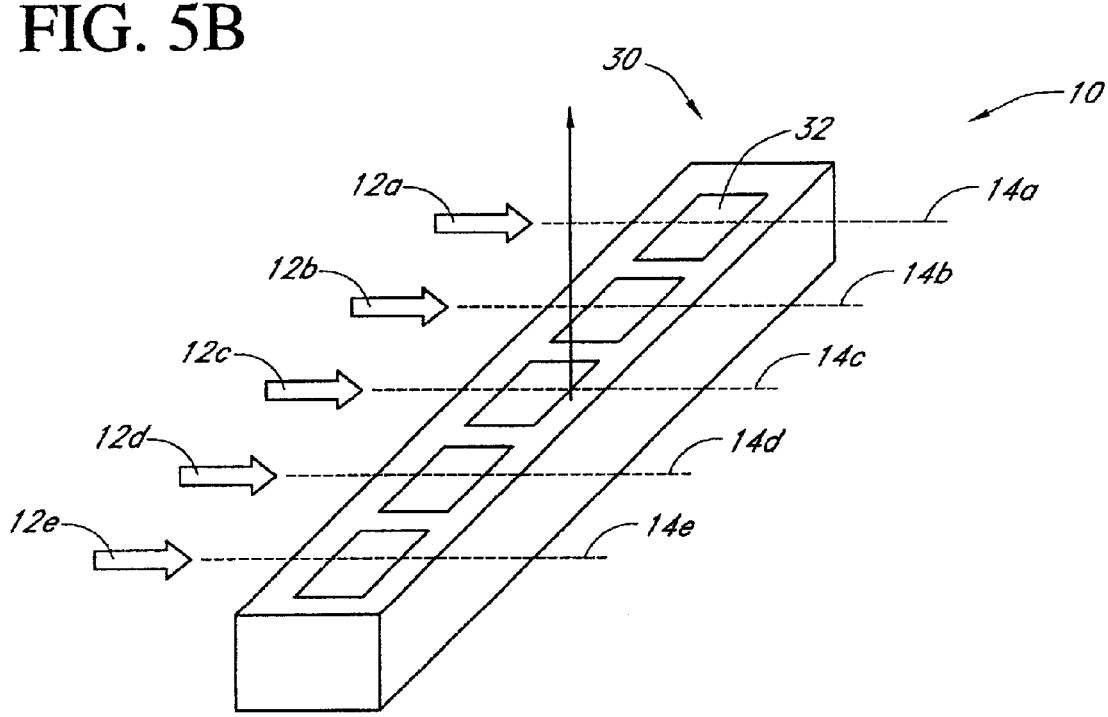

Alternatively, in other embodiments in which only attenuation, and not switching is warranted, the apparatus 10 can comprise an array 30 with only one module 32 for each light beam 12, as schematically illustrated in FIGS. 5A and 5B. For example, in embodiments in which there are five light beams 12 to be attenuated, there are five modules 32 with one module 32 positioned below each of the beam paths 14. Furthermore as described more fully below, the reflector 40 of each module 32 of the embodiment schematically illustrated in FIGS. 5A and 5B is to be substantially perpendicular to the beam path 14. In such an embodiment, each module 32 can intercept at least a portion of the corresponding light beam 12 from the beam path 14. Persons skilled in the art can configure an array 30 with an appropriate number and configuration of modules 32 to at least partially intercept light beams 12 in accordance with embodiments of the present invention.

As schematically illustrated in FIGS. 3 and 4, each of the modules 32 comprises a reflector 40 comprising single crystal silicon and a reflector surface 42 lying in a reflector plane 44 substantially perpendicular to the substrate surface 22. As used herein, the term "reflector" is used to denote a body which reflects a portion of the electromagnetic radiation incident on the body. As is described more fully below, in certain embodiments, the reflector 40 is fabricated from the single crystal silicon substrate 20, so the reflector 40 comprises a portion of the single crystal silicon substrate 20. In such embodiments, the reflector surface 42 has a {111} crystallographic orientation when the substrate surface 22 has a {110} crystallographic orientation. Also, in such embodiments, the reflector surface 42 has a {100} crystallographic orientation when the substrate surface 22 has a {100} crystallographic orientation. The {111} crystallographic orientation of the reflector surface 42 provides a mechanically robust, smooth, and low stress surface which is preferable over polycrystalline reflector surfaces which have a high degree of stress, often resulting in inherent curvature of the surface.

In certain embodiments, the reflector 40 further comprises a metal layer formed as part of the reflector surface 42. Examples of materials for the metal layer include, but are not limited to, chromium, gold, titanium, aluminum, silver, platinum, or combinations of these materials. The thickness of the metal layer is preferably between approximately 10 Å to approximately 1000 Å, more preferably between approximately 100 Å to approximately 900 Å, and most preferably between approximately 200 Å to approximately 600 Å. In certain embodiments, the reflector surface 42 reflects substantially all of the incident light beam 12. In other embodiments, the reflector surface 42 reflects a portion of the incident light beam 12 and transmits a second portion of the incident light beam 12. As described more fully below, the thickness of the metal layer can be selected to provide a desired reflectivity and transmittance of the incoming optical power incident on the reflector 40.

Due to the fabrication process described below and the crystallographic directions of the single crystal silicon substrate 20, the reflector 40 schematically illustrated in FIGS. 3 and 4 has a generally rectangular shape. Furthermore, the height 43 of the reflector 40 in such embodiments is constrained to be less than or equal to the thickness 23 of the silicon substrate 20, while there is no such constraint on the width 45 of the reflector 40. The height 43 of the reflector 40 is preferably between approximately 10 µm and approximately 1000 µm, more preferably between approximately 200 µm and approximately 800 µm, and most preferably between approximately 400 µm and approximately 600 µm. Typically, the width 45 of the reflector 40 is approximately 700 µm, and the thickness 47 of the reflector 40 is typically between approximately 20 µm and approximately 30 µm. Other widths and thicknesses of the reflector 40 are also compatible with embodiments of the present invention.

The reflector support 50 mounts the reflector 40 to move substantially within the reflector plane 44 with a displacement component 46 along the surface normal direction 24 of the substrate surface 22. In the embodiment schematically illustrated in FIGS. 3 and 4, the reflector support 50 comprises a flap 52 and at least one coupler 54 which mechanically couples the flap 52 to the substrate 20. The flap 52 is generally flat and parallelogram-shaped, and can be positioned substantially parallel to the substrate surface 22 as schematically illustrated in FIG. 3. In certain embodiments, the shape of the flap 52 is defined by the crystallography of the single crystal silicon substrate 20 and the fabrication process. The dimensions of the sides of the flap 52 are preferably between approximately 0.2 mm and approximately 10 mm, more preferably between approximately 0.5 mm and approximately 5 mm, and most preferably between approximately 1 mm and approximately 3 mm. The thickness of the flap 52 is typically between approximately 3 µm and approximately 50 µm, but other thicknesses are also compatible with embodiments of the present invention.

In certain embodiments, the flap 52 is at least partially fabricated from the single crystal silicon substrate 20, so the flap 52 comprises single crystal silicon. In other embodiments, the flap 52 comprises other materials which can include, but are not limited to, polycrystalline silicon, amorphous silicon, silicon nitride, silicon carbide, metal, or a combination of these materials. Persons skilled in the art can select appropriate materials for the flap 52 in accordance with various embodiments of the present invention.

Figure 6:
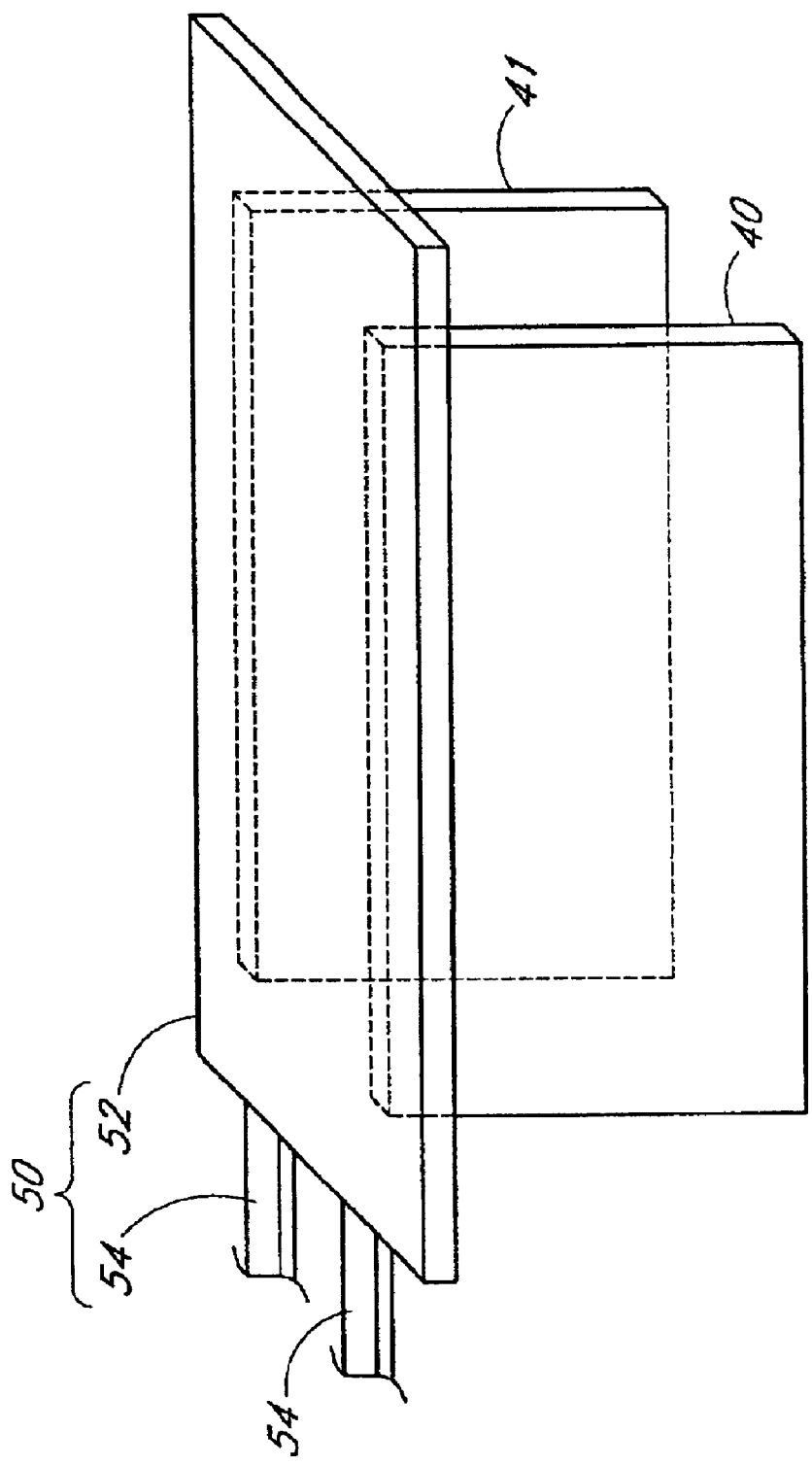
FIG. 6 schematically illustrates a module comprising a compensation structure.

In certain embodiments, the module 32 further comprises a compensation structure 41 which comprises single crystal silicon, as schematically illustrated in FIG. 6. In this embodiment, the compensation structure 41 is similar to the reflector 40 in that both the compensation structure 41 and the reflector 40 have the same general dimensions and comprise the same general materials. In addition, as is described more fully below, the compensation structure 41 is fabricated along with the reflector 40. In certain embodiments, the compensation structure 41 can serve as a counterbalancing mass which balances the mass of the reflector 40 to provide more symmetric dynamics of the reflector support 50 and as a thermal mass to provide more symmetric response of the reflector support 50 to thermal fluctuations. In such embodiments, the compensation structure 41 and reflector 40 are positioned symmetrically with respect to an axis of symmetry of the reflector support 50. In addition, in other embodiments, the compensation structure 41 comprises a second reflector surface which can be utilized to deflect a light beam 12, as is described more fully below.

In the embodiment schematically illustrated in FIG. 3, the flap 52 is coupled to the substrate 20 by a pair of couplers 54. The presence of more than one coupler 54 helps to ensure rigidity to keep the reflector surface 42 substantially perpendicular to the substrate surface 22. In embodiments in which the couplers 54 are at least partially fabricated from the single crystal silicon substrate 20, the couplers 54 comprise single crystal silicon. In other embodiments, the couplers 54 comprise other materials which can include, but are not limited to, polycrystalline silicon, amorphous silicon, silicon nitride, silicon carbide, metal, or a combination of these materials.

In the embodiment schematically illustrated in FIGS. 3 and 4, each coupler 54 comprises a cantilever 55 which couples the flap 52 to the substrate 20. In such an embodiment, the flap 52 is movable relative to the substrate 20, as schematically illustrated in FIG. 4. As the flap 52 is moved away from its equilibrium position, the cantilevers 55 provide a restoring force in a direction to return the flap 52 to its equilibrium position. In the embodiment schematically illustrated in FIGS. 3 and 4, the cantilevers 55 are not bent when the flap 52 is in its equilibrium position.

Figure 7A:
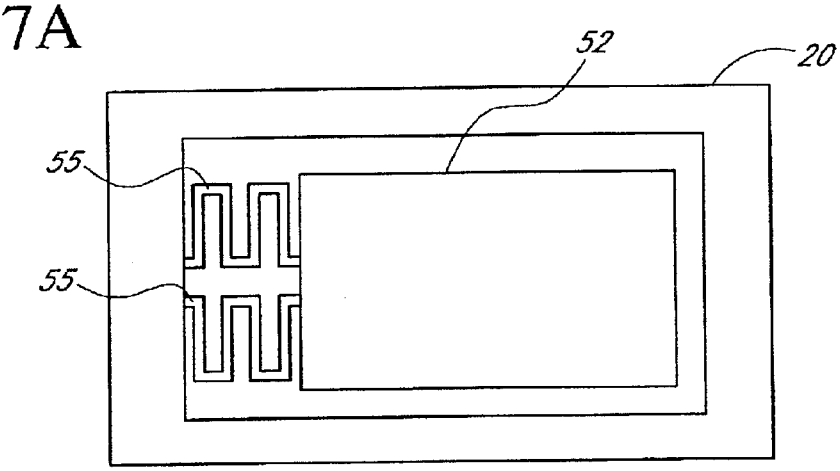
FIG. 7A schematically illustrates a cantilever with a serpentine configuration which couples the flap to the substrate.
Figure 7B:
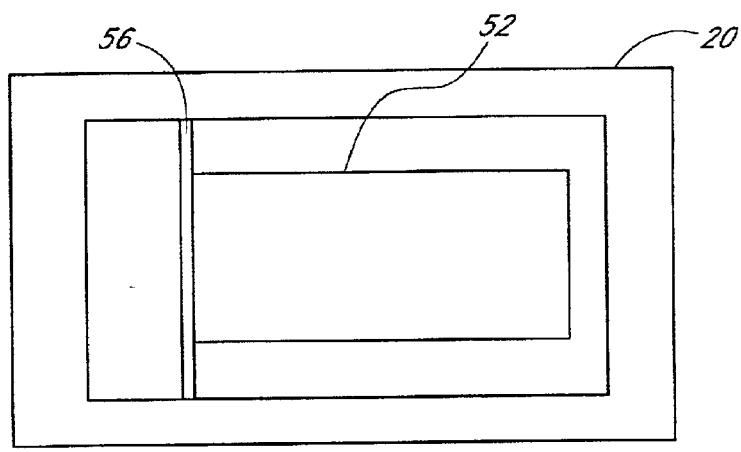
FIGS. 7B and 7C schematically illustrate two types of torsional springs which couples the flap to the substrate.
Figure 7C:
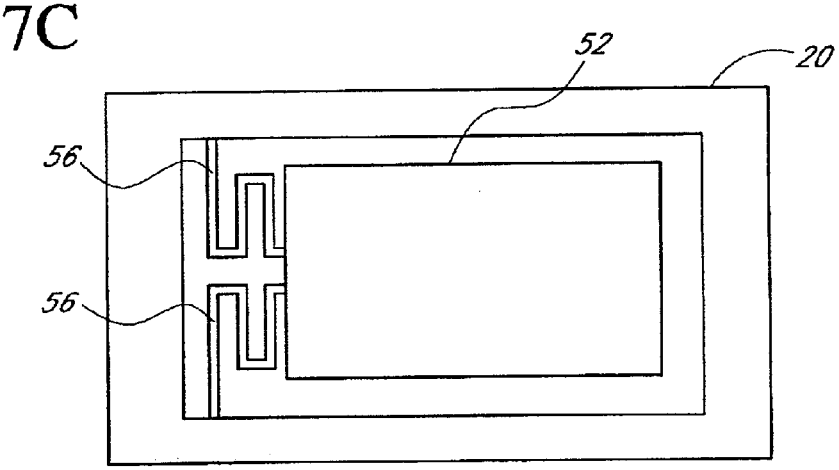

Alternatively, as schematically illustrated in FIGS. 7A, 7B, and 7C, the coupler 54 can have other configurations. FIG. 7A schematically illustrates a cantilever 55 with a serpentine configuration which couples the flap 52 to the substrate 20. FIGS. 7B and 7C schematically illustrate two types of torsional springs 56 which couples the flap 52 to the substrate 20, a straight configuration (FIG. 7B), and a serpentine configuration (FIG. 7C). In each of these embodiments, as the flap 52 is moved away from its equilibrium position, the couplers 54 provides a restoring force in a direction to return the flap 52 to its equilibrium position. In the embodiments schematically illustrated in FIGS. 3, 4, 7A, 7B, and 7C, the flap 52 is substantially parallel to the substrate surface 22 when in its equilibrium position. Alternatively, in other embodiments, the flap 52 is tilted at an angle relative to the substrate surface 22 when the flap 52 is in its equilibrium position.

As schematically illustrated in FIGS. 3 and 4, the reflector plane 44 is substantially perpendicular to the flap 52 and the flap 52 is coupled to the substrate 20 such that the flap 52 is rotatable about an axis of rotation which is parallel with the substrate surface 22 and perpendicular to the reflector plane 44. In this way, the reflector 40 is mounted to the flap 52 of the reflector support 50 such that the reflector 40 moves substantially within the reflector plane 44. The movement of the reflector 40 can be described as having a displacement vector, and this displacement vector has a displacement component 46 along the surface normal direction 24 of the substrate surface 22. Besides the displacement vector, this movement of the reflector 40 also comprises a rotation of the reflector 40, as schematically illustrated in FIG. 4.

Figure 8:
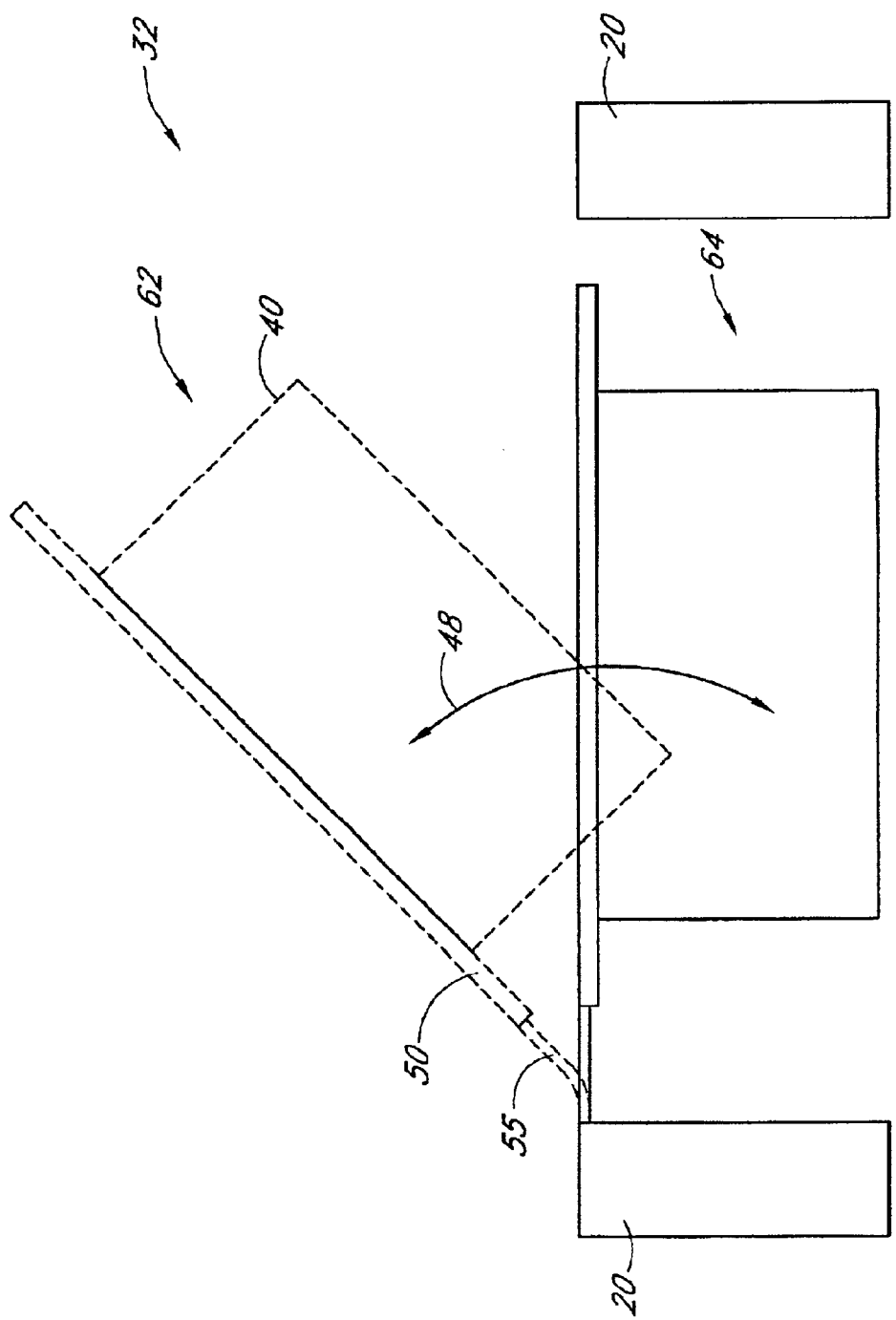
FIG. 8 schematically illustrates the movement of the reflector along a curved path lying substantially in the reflector plane.

This movement of the reflector 40 can also be described as moving along a curved path 48 lying substantially in the reflector plane 44, as schematically illustrated in FIG. 8. By following this curved path 48, the reflector 40 rotates about an axis substantially perpendicular to the reflector plane 44. In certain other embodiments, the curved path 48 can also include a displacement of the reflector 40 which is dependent on the particular deflection experienced by the coupler 54.

The reflector driver 60 is responsive to electrical current to selectively move the reflector 40 between a first position 62 and a second position 64. The reflector driver 60 comprises a portion which is mounted to the reflector support 50 and is conductive to electrical current. In the embodiment schematically illustrated in FIG. 3, the reflector driver 60 comprises a magnetic actuator 70 which comprises a magnetic field 71 generated externally from the array 30 and an electrical conduit 72 mechanically coupled to the reflector support 50. The magnetic field 71 is generated by a magnet (not shown) which can be a permanent magnet or an electromagnet. For example, the substrate 20 can be placed in the airgap between the poles of a magnetic yoke, with the pole shapes optimized to improve the uniformity of the magnetic field. The magnetic field strength depends somewhat on the design and spring constants of the module 32, and in certain embodiments, the magnetic field strength is approximately 5000 gauss.

In certain embodiments, the poles of the magnet are spaced from the substrate surface 22 such that the magnetic field 71 has a component perpendicular to the substrate surface 22 and substantially uniform in a region above the array 30. The magnetic field 71 of such embodiments forms an angle 73 with the surface normal direction 24 of the substrate surface 22 and has a component parallel to the reflector surface 42. In alternative embodiments, the substrate 20 can be placed in the airgap such that the magnetic field 71 is parallel to the substrate surface 22. In still other embodiments, individual north-south pole pairs can be located under or above each flap 52 to generate a separate magnetic field 71 for each module 32.

In the embodiment schematically illustrated in FIG. 3, the electrical conduit 72 is fabricated on the flap 52 and extends across the couplers 54. In certain embodiments, such as the embodiment schematically illustrated in FIG. 3, the electrical conduit 72 has a generally spiral configuration and has two conductive layers on top of one another, separated by an insulating layer. Electrical current enters and flows through the spiral-patterned first conductive layer, and exits through the second conductive layer. The electrical current can be supplied from an off-substrate source by using standard electrical connections such as bond wires and bond pads located on the substrate 20. Other embodiments can utilize electrical conduits 72 with other configurations.

Figure 9:
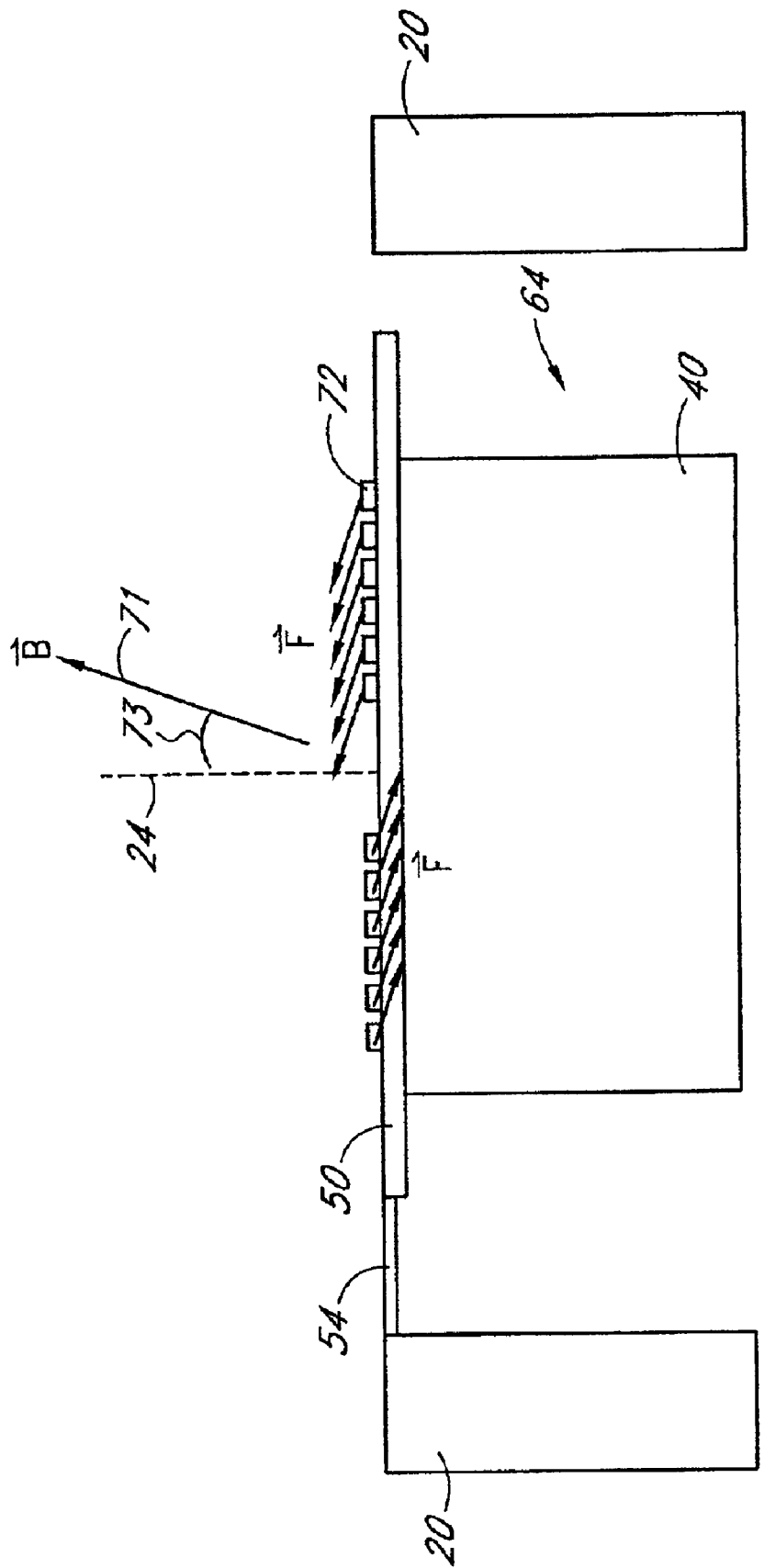
FIG. 9 schematically illustrates a reflector driver comprising a magnetic actuator.

By applying the magnetic field 71 and flowing an electrical current through the electrical conduit 72, as schematically illustrated in FIG. 9, the magnetic actuator 70 generates a torque which moves the reflector 40 between the first position 62 and second position 64. An electrical current flowing through the electrical conduit 72 interacts with the externally-applied magnetic field 71 to create forces on the electrical conduit 72 which are perpendicular to both the magnetic field 71 and the electrical conduit 72 at each point along the electrical conduit 72. These forces are given by the equation F=I×B, where I is the current vector through the electrical conduit 72 and B is the magnetic field vector 71 and I×B denotes the vector cross product of the current vector and the magnetic field vector. For the embodiment schematically illustrated in FIGS. 3 and 9, the sum of these forces on the electrical conduit 72 is substantially zero. However, the sum of the torques generated by these forces about the axis of rotation is non-zero because the forces are applied to the electrical conduit 72 at different distances from the axis of rotation. In this way, a non-zero torque is produced by the forces generated when electrical current flows through the electrical conduit 72, thereby deflecting the flap 52 and reflector 40. The forces produced by the electrical current will deflect the flap 52 either up or down, depending on the direction of the electrical current and the direction of the magnetic field 71. The deflection reaches a position at which the torque produced by the restoring force of the couplers 54 equals the torque produced by the forces generated by the flow of electrical current. By adjusting the magnitude of the electrical current, and thereby adjusting the torque applied by the reflector driver 60, the amount of deflection of the flap 52 and reflector 40 can be controlled. For certain embodiments of fiber optic switching applications, the deflection is determined by the beam size, typically between 5 $\mu$m and 600 $\mu$m, and power consumption is typically on the order of tens of milliwatts.

In other embodiments, the module 32 can comprise more than one electrical conduit 72 on the flap 52. For example, the flap 52 can have two electrical conduits 72. In such embodiments, each electrical conduit 72 can have a separate electrical current applied to it, thereby providing additional control on the forces applied to the flap 52 to more precisely control the movement of the flap 52 and reflector 40.

Figure 10:
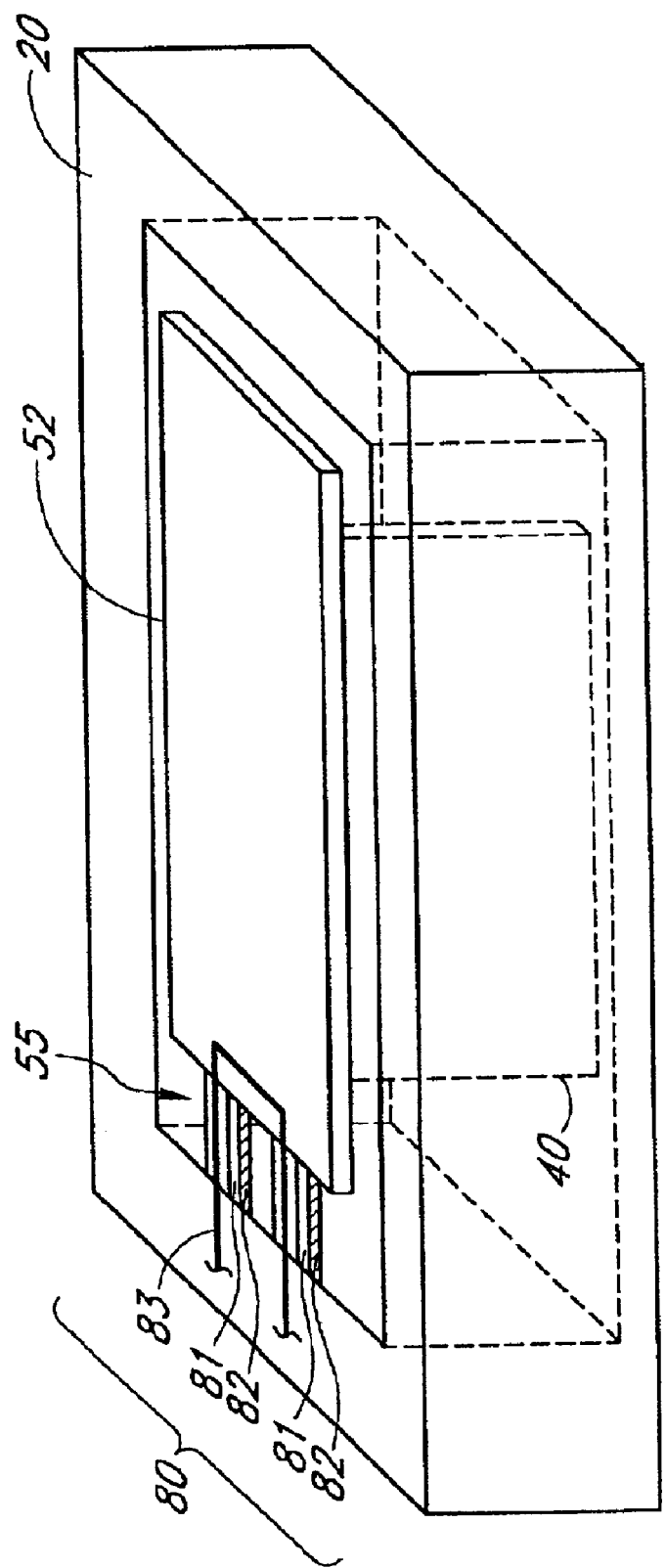
FIG. 10 schematically illustrates a reflector driver comprising a thermal actuator.

In other embodiments, such as schematically illustrated in FIG. 10, the reflector driver 60 comprises a thermal actuator 80 which comprises a first material 81 and a second material 82 which expand by differing amounts in response to thermal energy generated by the electrical current. Expressed differently, the first material 81 has a different thermal coefficient of expansion than does the second material 82. Examples of materials which can be utilized as the first material 81 and second material 82 include, but are not limited to, single crystal silicon, polycrystalline silicon, silicon nitride, metal, or a combination of these materials.

Figure 11A:
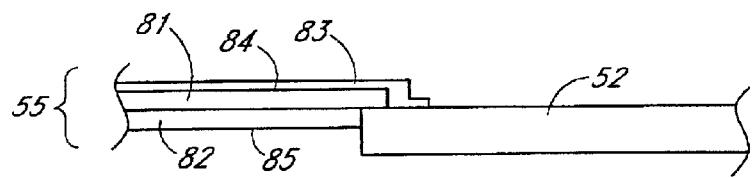
FIG. 11A schematically illustrates a thermal actuator comprising a first material and a second material.
Figure 11B:
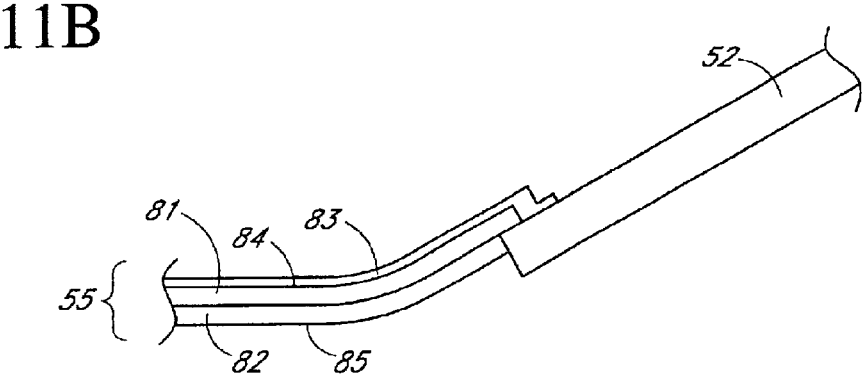
FIG. 11B schematically illustrates the displacement of the thermal actuator upon heating where the first material has a lower thermal coefficient of expansion than that of the second material.
Figure 11C:
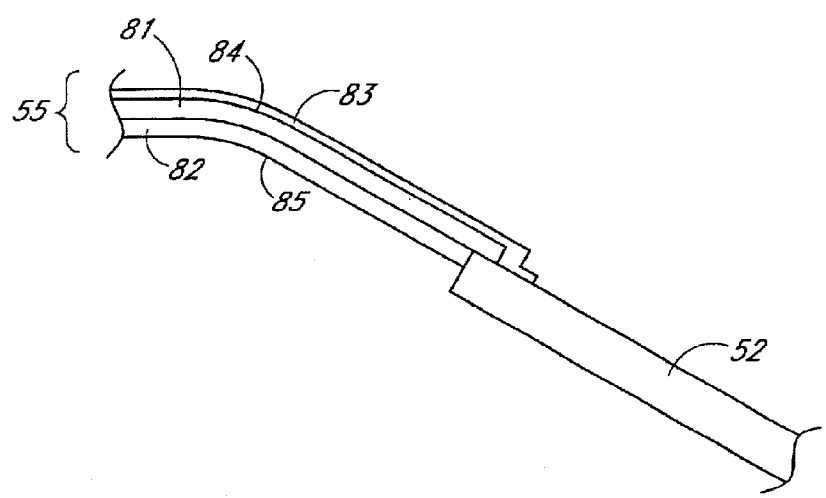
FIG. 11C schematically illustrates the displacement of the thermal actuator upon heating where the first material has a higher thermal coefficient of expansion than that of the second material.

In the embodiment schematically illustrated in FIG. 10, the thermal actuator 80 comprises a pair of cantilevers 55, such as described above in relation to the reflector support 50, and at least one electrical conduit 83. In such embodiments, the cantilevers 55 serve as part of both the reflector support 50 and the reflector driver 60. Each cantilever 55 is configured to have a first portion 84 comprising the first material 81, and a second portion 85 comprising the second material 82. The first portion 84 and second portion 85 are configured in relation to one another to provide a displacement of the flap 52 as described herein. As schematically illustrated in FIGS. 11A–11C, in one embodiment, the first portion 84 is on top of the second portion 85, and both the first portion 84 and second portion 85 are coupled to the substrate 20 and the flap 52. Other configurations of the first portion 84 and second portion 85 are compatible with embodiments of the present invention.

The electrical conduit 83 is configured to generate thermal energy via joule heating upon flowing an electrical current flowing therethrough. Furthermore, the electrical conduit 83 is configured such that the cantilevers 55 are exposed to the thermal energy generated by the electrical current. In certain embodiments, such as the embodiment schematically illustrated in FIGS. 11A–11C, the electrical conduit 83 comprises a metal layer on the flap 52 and the couplers 54. Examples of materials for the electrical conduit 83 include, but are not limited to, chromium, gold, titanium, aluminum, copper, nickel, or combinations of these materials. Alternatively in other embodiments, the electrical conduit 83 comprises the cantilevers 55 which are electrically conductive. In such an embodiment, electrical current can flow through the cantilevers 55 themselves. The electrical current can be supplied from an off-substrate source by using standard electrical connections such as bond wires and bond pads located on the substrate 20.

In embodiments in which the cantilevers 55 are initially straight when not heated, as schematically illustrated in FIG. 11A, heating the cantilevers 55 by applying electrical current to the electrical conduit 83 will curve the cantilevers 55 out of the plane of the substrate surface 22, thereby raising (FIG. 11B) or lowering (FIG. 11C) the flap 52 and reflector 40 from their original positions. In the embodiment schematically illustrated in FIG. 11B, the raising of the flap 52 is achieved by using a first material 81 which has a lower thermal coefficient of expansion than that of the second material 82. In the embodiment schematically illustrated in FIG. 11C, the lowering of the flap 52 is achieved by using a first material 81 which has a higher thermal coefficient of expansion than that of the second material 82. Similarly, for embodiments in which the cantilevers 55 are initially curved out of the plane of the substrate surface 22, (e.g., due to intrinsic stresses in the cantilevers 55) applying electrical current to the electrical conduit 83 can straighten the cantilevers 55.

By selectively applying electrical current to the reflector driver 60 of selected modules 32, the movement of the reflectors 40 is individually addressable. The direction and magnitude of the displacement of the reflector 40 is dependent on the configuration of the first portion 84 and second portion 85 of the cantilevers 55 and on the difference of the thermal coefficients of expansion for the first material 81 and second material 82. When the electrical current is removed and the cantilevers 55 are permitted to cool, the reflector 40 returns to its original position. By adjusting the magnitude of the electrical current, the amount of deflection of the flap 52 and reflector 40 can be controlled. For certain embodiments of fiber optic switching applications, the deflection is determined by the beam size, typically 5 $\mu$m to 600 $\mu$m, and power consumption is typically on the order of tens of milliwatts.

The reflector driver 60 of a given module 32 selectively moves the reflector 40 of the module 32 between a first position 62 and a second position 64. When in the first position 62, the reflector 40 intercepts at least a portion of one of the beam paths 14. When in the second position 64, the reflector 40 does not intercept the portion of one of the beam paths 14. The reflector 40 moves to the first position 62 when electrical current flows through the conductive portion of the reflector driver 60, whereby the movement of the reflectors 40 is individually addressable. The reflector 40 moves to the second position 64 when electrical current ceases to flow through the conductive portion of the reflector driver 60. In certain embodiments, the reflector 40 in the first position 62 is deflected out of the substrate surface 22, and the second position 64 is the equilibrium position of the reflector 40, as schematically illustrated in FIG. 4.

Figure 12:
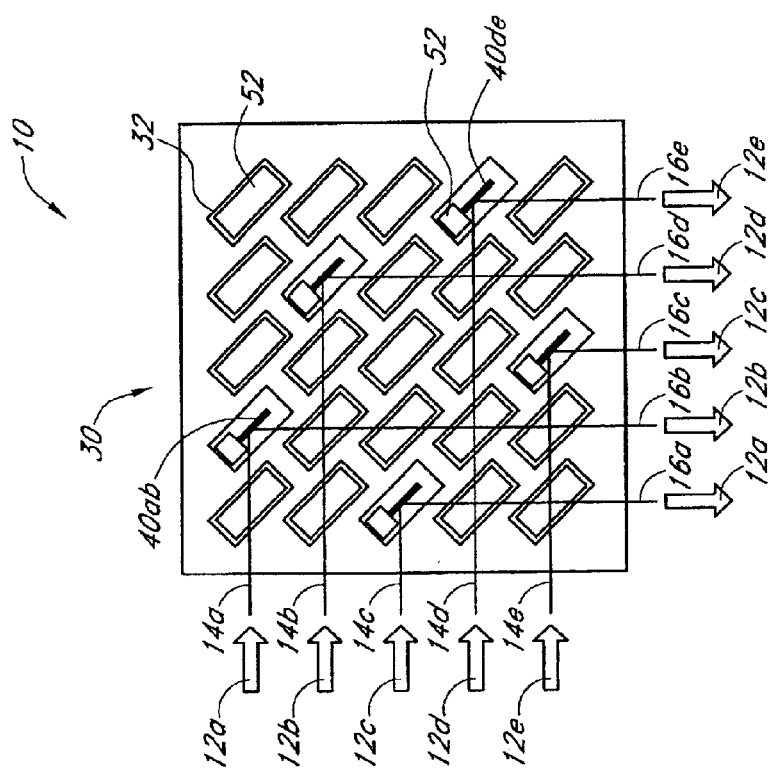
FIG. 12 schematically illustrates one embodiment of the apparatus comprising a (5×5) array configured to switch at least one light beam from a beam path to a second beam path.

FIG. 12 schematically illustrates one embodiment in which the apparatus 10 comprises a (5×5) array 30 configured to switch at least one light beam 12 from a beam path 14 to a second beam path 16. In the embodiment schematically illustrated in FIG. 12, the plurality of light beams 12 are propagating along the plurality of beam paths 14, which are configured to be above and substantially parallel to the substrate surface 22. By selectively addressing one of the five reflectors 40aa–40ae corresponding to the beam path 14a of the light beam 12a, the light beam 12a can be deflected into one of five second beam paths 16a–16e. For example, when the reflector 40ab is in the first position 62, and reflectors 40aa, 40ac–40ae are each in the second position 64, the reflector 40ab completely intercepts the beam path 14a, and deflects the light beam 12a into the second beam path 16b. Also, in certain embodiments, the size of the reflector 40 is larger than the spot size of the light beam 12, thereby requiring less precision in the positioning of the reflector 40 to completely intercept the beam path 14.

Similarly, one reflector 40 corresponding to each of the other light beams 12 can be moved into the first position 62 to completely intercept each beam path 14 and to deflect each of the light beams 12 into a unique second beam path 16. More generally, at any given time, N reflectors 40 would be moved into the first position 62, each with a unique column and row address, and the other $N^2-N$ reflectors 40 would be in the second position 64. In this way, each of the five light beams 12a–12e propagating along the five beam paths 14a–14e can be selectively deflected utilizing the twenty-five reflectors 40aa–40ee into five unique second beam paths 16a–16e.

Figure 13:
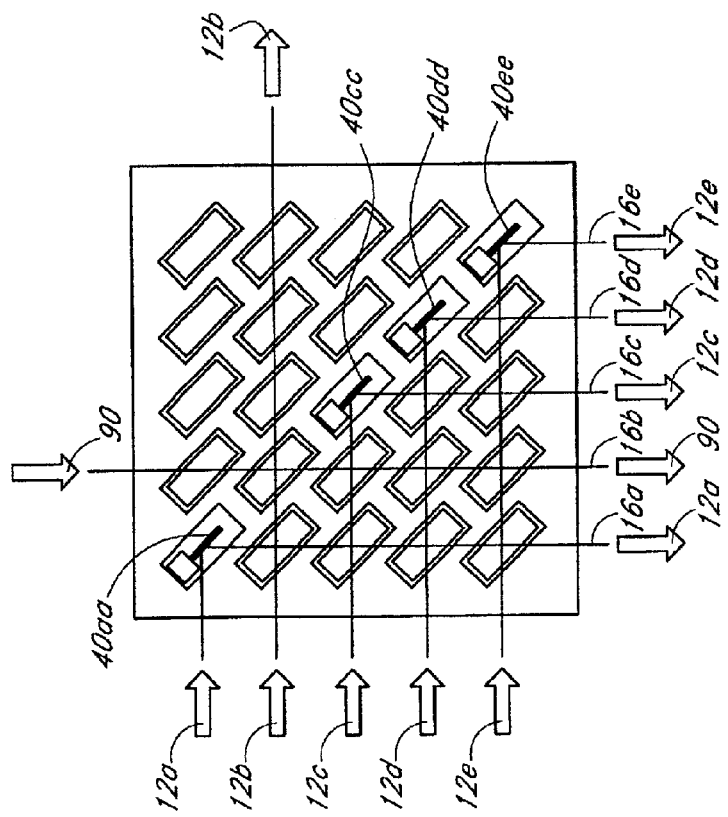
FIG. 13 schematically illustrates one embodiment of the apparatus which can be used as an optical add/drop multiplexer (OADM) with a maximum of five light beams.

Alternatively, the apparatus 10 can be used as an optical add/drop multiplexer (OADM) with a maximum of five light beams 12, as schematically illustrated in FIG. 13. In such an embodiment, one or more of the incoming light beams 12a–12e can be effectively "dropped" from the output of the apparatus 10 by not deflecting the dropped light beam 12 into one of the second beam paths 16a–16e. In addition, an incoming "added" second light beam 90 can propagate along the second beam path 16, effectively replacing the dropped light beam 12. For example, in the embodiment schematically illustrated in FIG. 13, the light beam 12b is dropped and the second light beam 90 is added in its place. By not selectively addressing any of the reflectors 40 corresponding to the beam path 14b, the dropped light beam 12b selected to be removed will continue to propagate along the beam path 14b. In this way, the output from the apparatus 10 has four of the incoming light beams 12a, 12c–12e and the added second light beam 90. This procedure of dropping an incoming light beam 12 and adding another second light beam 90 in its place is termed "optical add/drop multiplexing."

Figure 14:
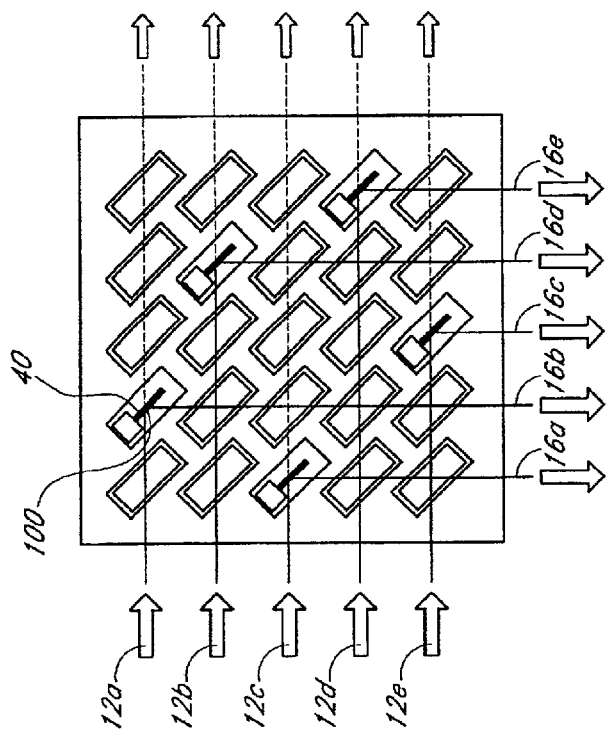
FIG. 14 schematically illustrates an embodiment in which the reflector is configured to transmit a portion of the incoming light beam, thereby switching only the remaining portion of the light beam.

Alternatively, in other embodiments, the reflector 40 is configured to transmit a portion of the incoming light beam 12, thereby switching only the remaining portion of the light beam 12. For example, as schematically illustrated in FIG. 14, one embodiment of the present invention can be used with infrared light beams 12. Because silicon transmits infrared light, each reflector 40 of this embodiment has a metal layer 100 with a thickness which determines the transmittance of the reflector 40 to the infrared light beam 12. The dependence of the reflectance and transmittance of metal layers as a function of layer thickness is described in pages 35.3–35.15 of "Handbook of Optics, Volume II: Devices, Measurements, and Properties," second edition, edited by Michael Bass, published by McGraw-Hill, Inc., which is incorporated herein in its entirety by reference. The thickness of the metal layer 100 is selected to provide a reflector 40 with a selected transmittance and reflectance to the light beam 12. While the reflected portion of the light beam 12 is switched to the second beam path 16, the transmitted portion of the light beam 12 which continues to propagate along the beam path 14 can be sampled to monitor the performance of the apparatus 10.

Figure 15A:
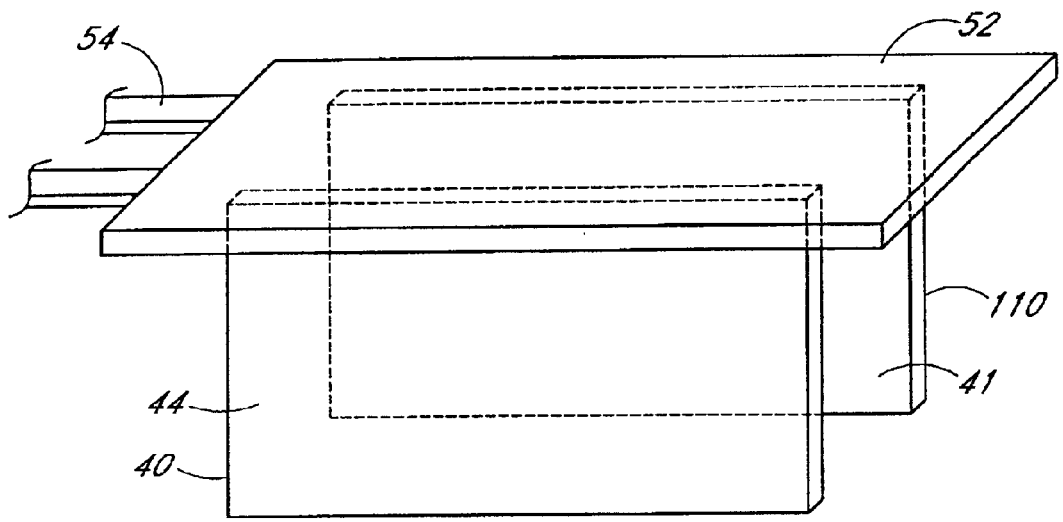
FIG. 15A schematically illustrates an embodiment which has modules which each comprise a compensation structure which comprises a second reflector surface.
Figure 15B:
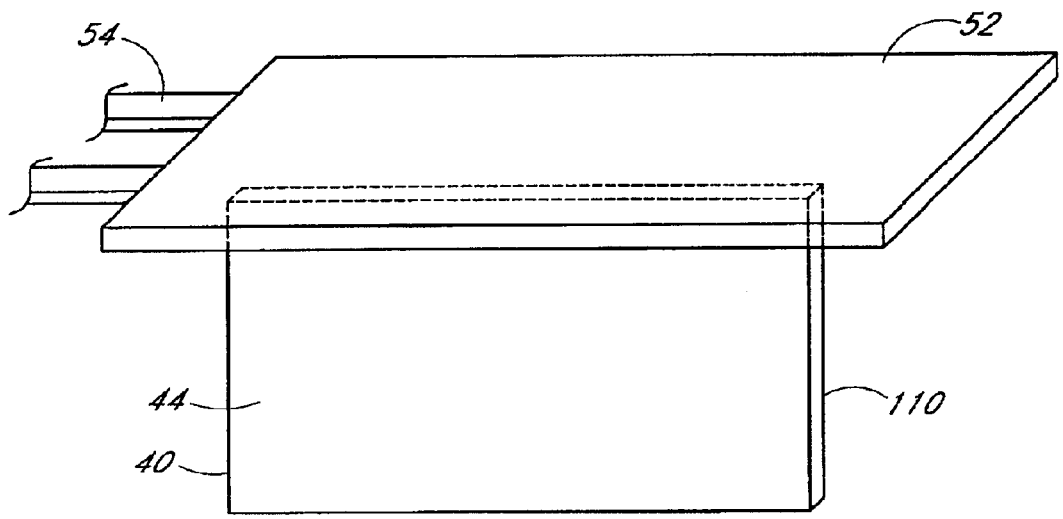
FIG. 15B schematically illustrates an embodiment in which the second reflector surface comprises the surface of the reflector which is opposite the reflector surface.

Other embodiments of the present invention utilize modules 32 which each comprise a second reflector surface 110. Certain embodiments, such as schematically illustrated in FIG. 15A have modules 32 which comprise a compensation structure 41 which comprises a second reflector surface 110. Alternatively as schematically illustrated in FIG. 15B, in other embodiments, the second reflector surface 110 can comprise the surface of the reflector 40 which is opposite the reflector surface 42.

Figure 16:
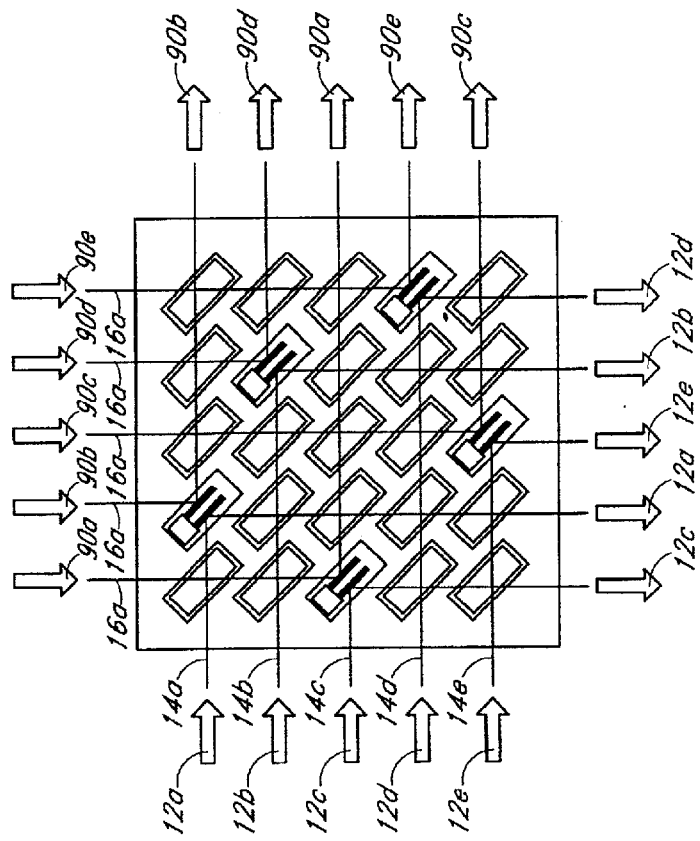
FIG. 16 schematically illustrates an embodiment with modules which each comprise a second reflector surface to be utilized in conjunction with transmit/receive pairs.

The second reflector surface 110 of each module 32 can be utilized in conjunction with transmit/receive pairs, as schematically illustrated in FIG. 16. In such an embodiment, incoming light beams 12a–12e are initially propagating along beam paths 14a–14e, and incoming second light beams 90a–90e are initially propagating along second beam paths 16a–16e. When the module 32 corresponding to beam path 14a and second beam path 16b is activated, light beam 12a is reflected by the reflector surface 42 from beam path 12a to second beam path 16b. At the same time, second light beam 90b is reflected by the second reflector surface 110 from the second beam path 16b into the beam path 12a. Thus, the light beam 12a and second light beam 90b have been exchanged with each other. Similarly, other pairs of light beams 12 and second light beams 90 can be exchanged with one another. Using the embodiment schematically illustrated in FIG. 16, up to five pairs of light beams 12 and second light beams 90 can be exchanged with one another.

In other embodiments, the apparatus 10 can be used as an optical attenuator to reduce the amount of optical power propagating along one or more of the beam paths 14. In one embodiment as schematically illustrated in FIG. 5, five light beams 12a–12e propagate into the apparatus 10 along their respective beam paths 14a–14e, and each light beam 12 has a corresponding module 32 and reflector 40. Each of the reflectors 40a–40e of the array 30 is individually addressable, so the five light beams 12a–12e can be individually attenuated. A reflector 40 in the first position 62 intercepts at least a portion of the respective beam path 14, and a reflector 40 in the second position 64 does not intercept the portion of the respective beam path 14.

Figure 17:
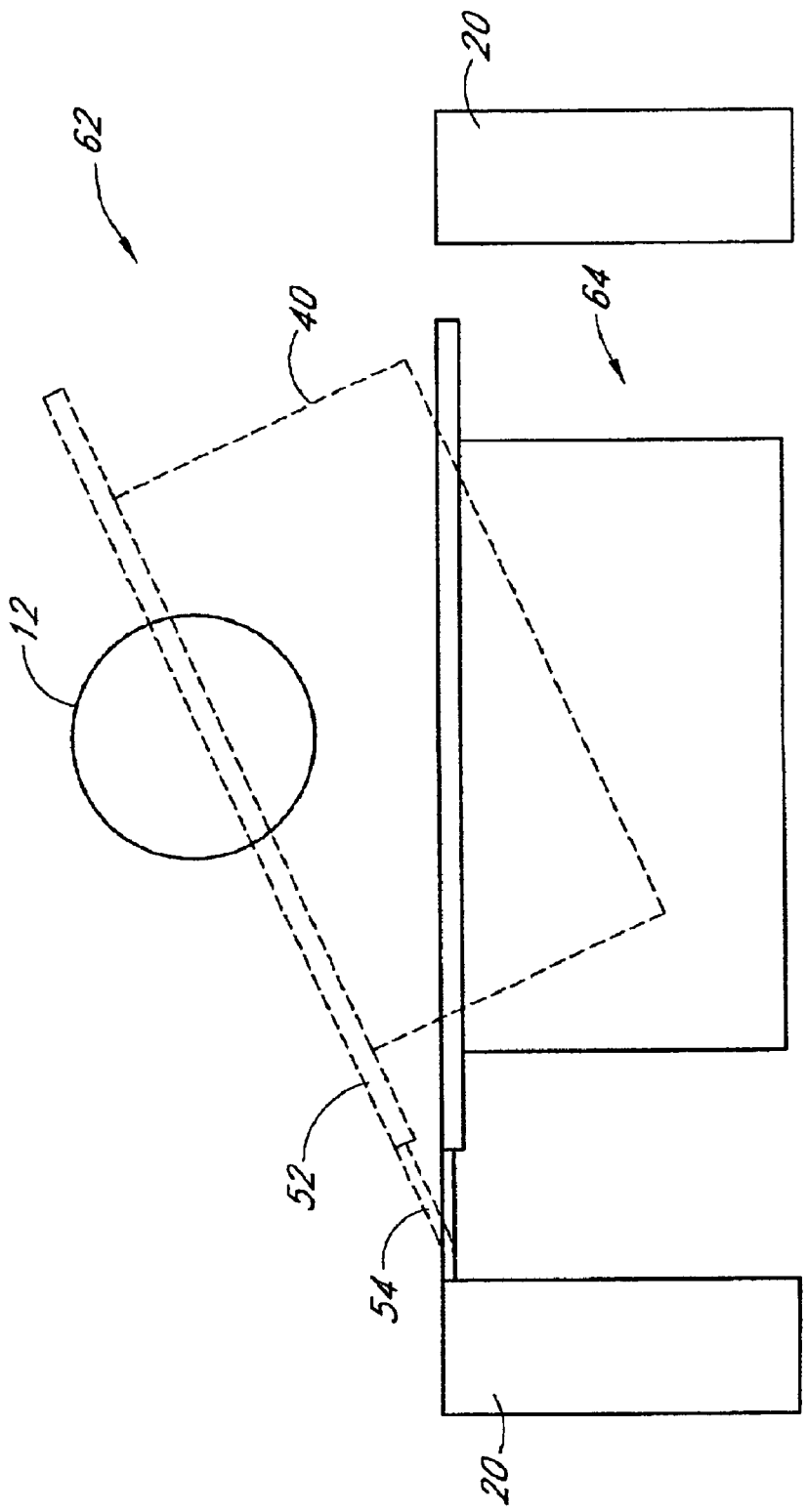
FIG. 17 schematically illustrates an embodiment in which the light beam can be attenuated by applying a selected amount of electrical current to the reflector driver to place the reflector in a selected first position.

In certain embodiments, the first position 62 of the reflector 40 is selectable, whereby the reflector 40 in the first position 62 intercepts a selected portion of the respective light beam 12. As described above, the deflection of the reflector 40 is controllable by adjusting the electrical current applied to the reflector driver 60 of the module 32. For example, as schematically illustrated in FIG. 17, the light beam 12 can be attenuated by applying a selected amount of electrical current to the reflector driver 60 to place the reflector 40 in a selected first position 62. In the embodiment schematically illustrated in FIG. 17, the first position 62 is selected such that 50% of the incoming optical power of the light beam 12 continues to propagate along the beam path 14. The remaining 50% of the incoming optical power of the light beam 12 is intercepted partially by the reflector 40 and partially by other components of the module 32, such as the flap 52. In certain other embodiments, the attenuation of light beams 12 can be combined with the switching of light beams. For example, rather than placing the reflector 40 in a first position 62 in which the reflector 40 completely intercepts the light beam 12, the first position 62 can be selected to only intercept a portion of the light beam 12, thereby switching the intercepted portion of the light beam 12 and transmitting the unintercepted portion of the light beam 12.

Figure 18:
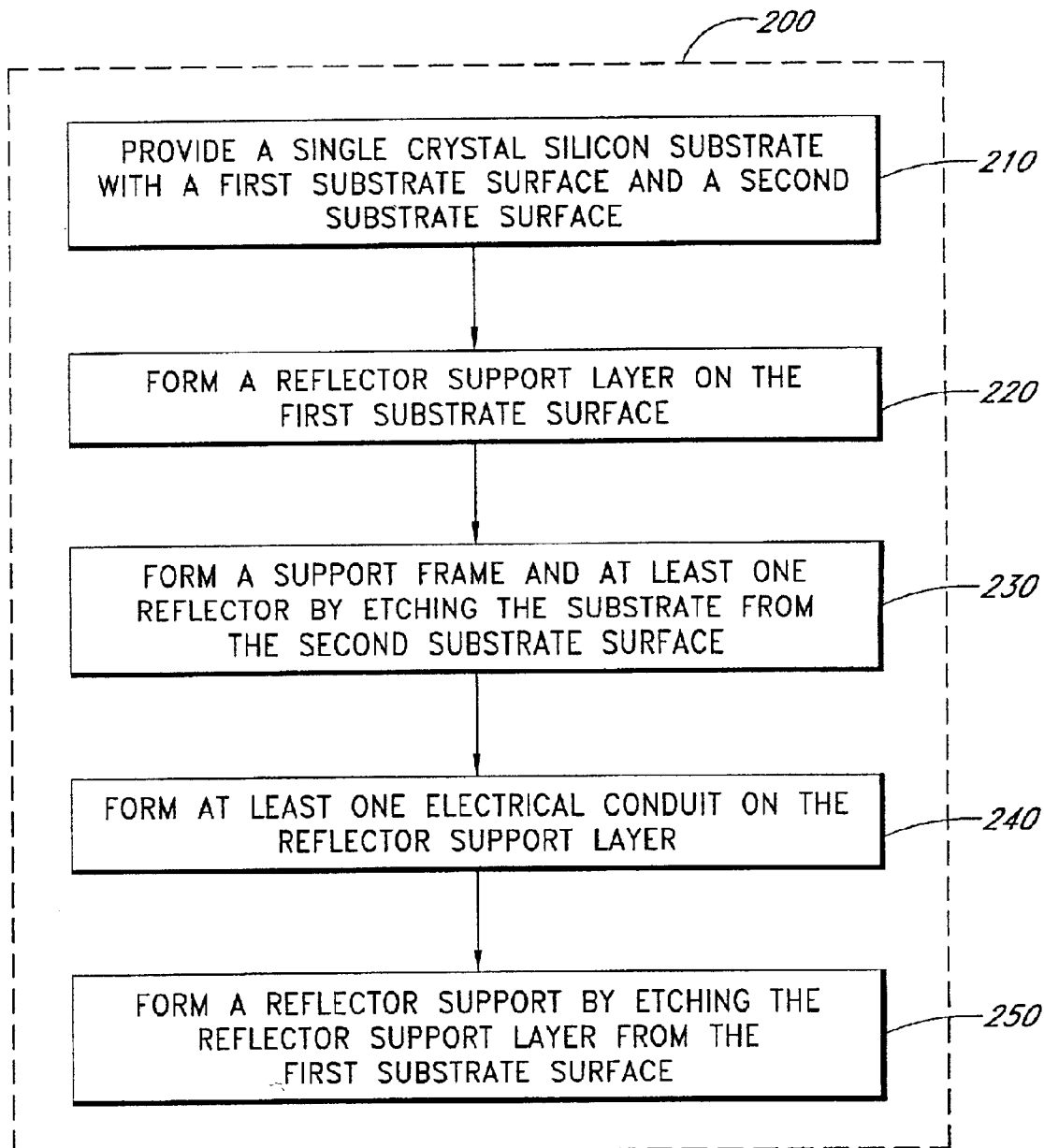
FIG. 18 is a flowchart corresponding to a method of fabricating a module for at least partially intercepting a light beam propagating along a beam path.

FIG. 18 is a flowchart corresponding to a method 200 of fabricating a module 32 for at least partially intercepting a light beam 12 propagating along a beam path 14. The method 200 comprises an operational block 210 for providing a single crystal silicon substrate 300 with a first substrate surface 310 and a second substrate surface 312. The method 200 further comprises an operational block 220 for forming a reflector support layer 320 on the first substrate surface 310. The method 200 further comprises an operational block 230 for forming a support frame 330 and at least one reflector 340 by etching the substrate 300 from the second substrate surface 312. The method 200 further comprises an operational block 240 for forming at least one electrical conduit 350 on the reflector support layer 320. The method 200 further comprises an operational block 250 for forming a reflector support 360 by etching the reflector support layer 320 from the first substrate surface 310. The reflector support 360 is mechanically coupled to the support frame 330 and the reflector 340. The reflector support 360 is movable such that the reflector 340 is movable substantially perpendicularly to the first substrate surface 310. FIGS. 19A–19K schematically illustrate the formation of the module 32 using one embodiment of the method 200.

A single crystal silicon substrate 300 with a first substrate surface 310 and a second substrate surface 312 is provided in the operational block 210. In the embodiment schematically illustrated in FIG. 19A, the single crystal silicon substrate 300 comprises a single crystal silicon substrate wafer with the first substrate surface 310 and second substrate surface 312 each having a {110} crystallographic orientation. Typically, the single crystal silicon substrate wafer is generally circular with a diameter of four inches. In other embodiments, the first substrate surface 310 and second substrate surface 312 each having a {100} crystallographic orientation. More generally, in other embodiments, the first substrate surface 310 and second substrate surface 312 each comprise at least one plateau surface region, with each plateau surface region having a {110} or {100} crystallographic orientation.

Figure 20:
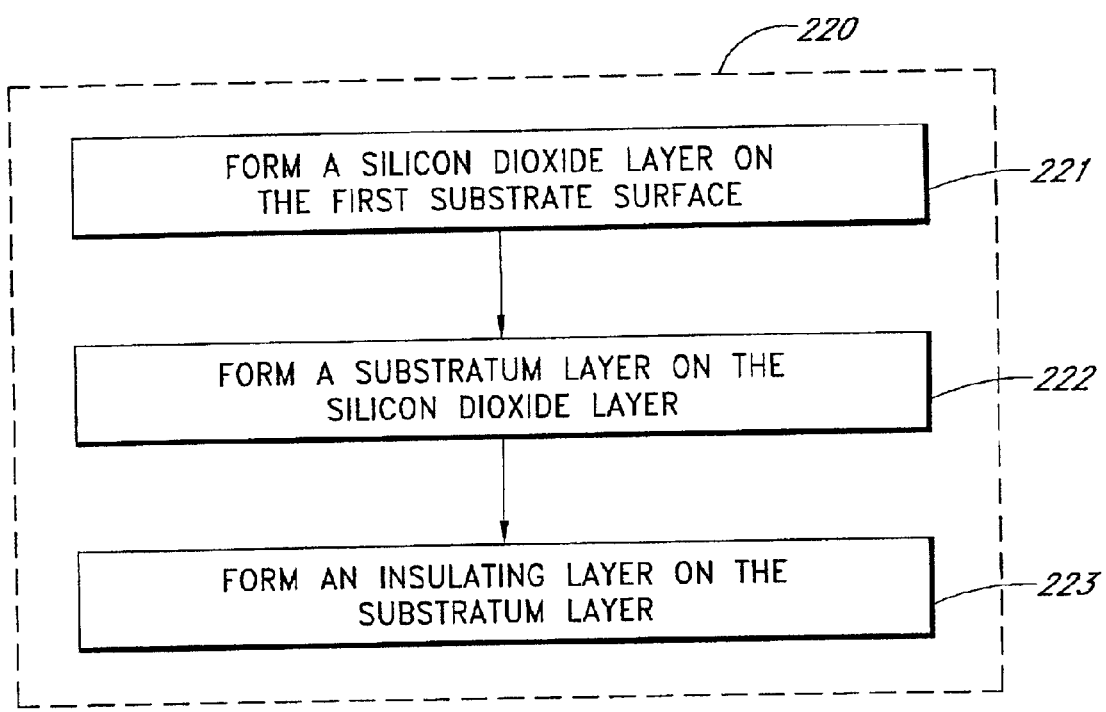
FIG. 20 is a flowchart of one embodiment for the formation of the reflector support layer on the first substrate surface.

A reflector support layer 320 is formed on the first substrate surface 310 in the operational block 220. FIG. 20 is a flowchart of one embodiment of operational block 220 for the formation of the reflector support layer 320 on the first substrate surface 310. In this embodiment, the operational block 220 comprises forming a silicon dioxide layer 321 on the first substrate surface 310 in an operational block 221, and forming a substratum layer 322 on the silicon dioxide layer 321 in an operational block 222. In certain embodiments, such as the embodiment illustrated in FIG. 20, the operational block 220 further comprises forming an insulating layer 323 on the substratum layer 322 in an operational block 223.

In certain embodiments, formation of the silicon dioxide layer 321 is performed by forming low-temperature oxide (LTO) using low-pressure chemical vapor deposition (LPCVD). In such a process, the first substrate surface 310 is exposed to silane and oxygen at pressures of approximately 350 mtorr while being held at temperatures of approximately 450 C. In certain embodiments, the first substrate surface 310 is also exposed to other gases, such as phosphine, to form the silicon dioxide film. The LTO LPCVD process is used to deposit a smooth silicon dioxide layer 321 with a thickness of approximately 2 μm. The deposition rate is a function of temperature, pressure, and gas flows, with higher temperatures favoring higher deposition rates. In the embodiment corresponding to FIG. 19A, the second substrate surface 312 is also exposed to the silane and oxygen and held at approximately 450 C, so a silicon dioxide layer 324 is also formed on the second substrate surface 312. As is described more fully below, this silicon dioxide layer 324 is used in later processing steps.

Figure 21:
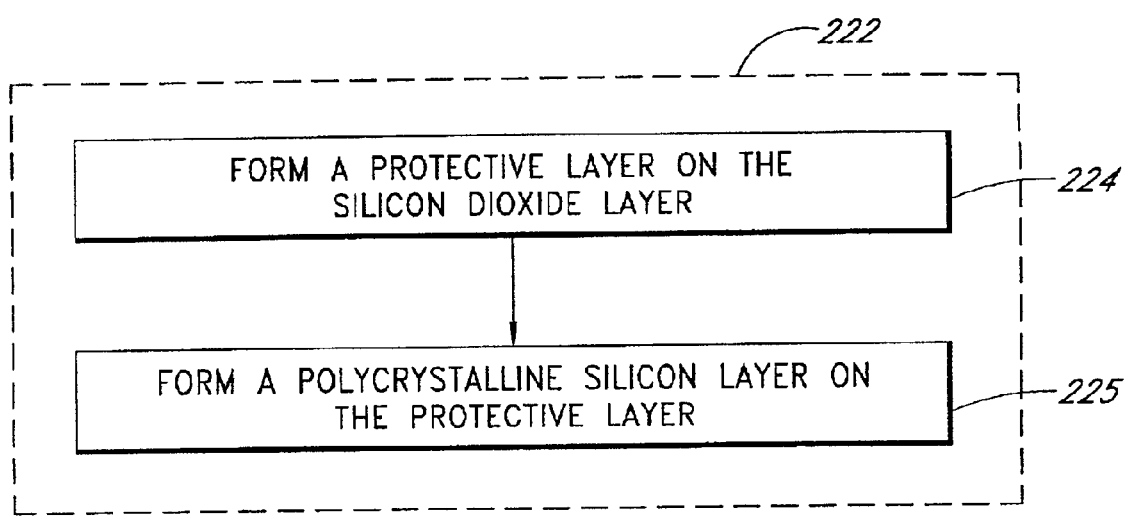
FIG. 21 is a flowchart of one embodiment for forming a substratum layer on the silicon dioxide layer.

A substratum layer 322 is formed on the silicon dioxide layer 321 in the operational block 222, one embodiment of which is shown in FIG. 21. The operational block 222 comprises forming a protective layer 325 on the silicon dioxide layer 321 in an operational block 224, and forming a polycrystalline silicon layer 326 on the protective layer 325 in an operational block 225. In certain embodiments, the protective layer 325 comprises silicon nitride, which is deposited onto the silicon dioxide layer 321 by LPCVD using silicon-containing gases such as silane or dichlorosilane and nitrogen-containing gases such as ammonia. The thickness of the silicon nitride resulting from exposing the silicon dioxide layer 321 at approximately 820 C for approximately 30 minutes is approximately 0.2 μm. Other embodiments can deposit the silicon nitride using other techniques, or can utilize other materials for the protective layer 325. The polycrystalline silicon layer 326 is formed on the protective layer by LPCVD. Other embodiments can deposit the polycrystalline silicon layer 326 using other techniques.

An insulating layer 323 is formed on the substratum layer 322 in the operational block 223. In certain embodiments, the insulating layer 323 comprises silicon nitride, which is deposited onto the substratum layer 322 using a LPCVD process similar to that used to form the protective layer 325, as described above. The resulting thickness of the insulating layer 323 is approximately 0.2 μm. Other embodiments can deposit the silicon nitride using other techniques.

Figure 19A:
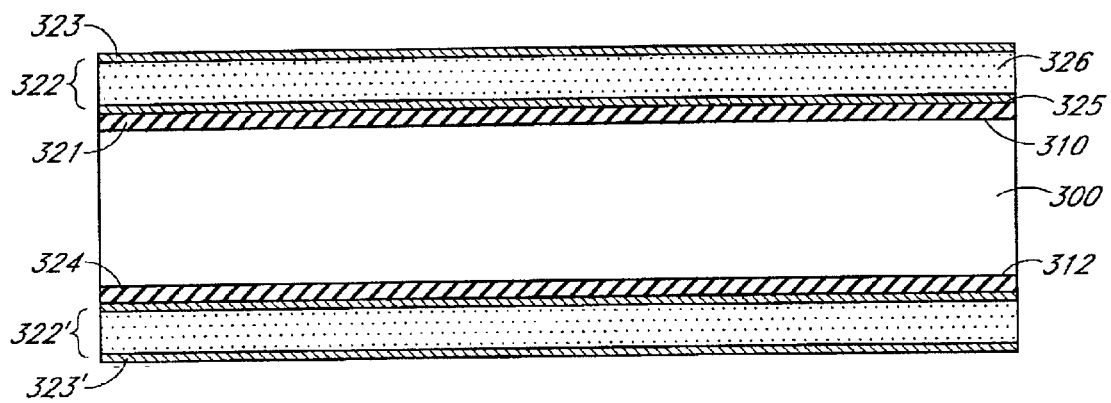
FIGS. 19A–19K schematically illustrate the formation of the module using one embodiment of the method.

The process of forming the substratum layer 322 on the silicon dioxide layer 321 and the insulating layer 323 on the substratum layer 322 can also form similar layers 322', 323' on the second substrate surface 312, as schematically illustrated in FIG. 19A. Using a dry plasma etching process, these layers 322', 323' can be removed while leaving the silicon dioxide layer 324 on the second substrate surface 312, resulting in the structure schematically illustrated in FIG. 19B. Other embodiments can remove the layers 322', 323' using different techniques, or can avoid forming these layers 322', 323' during deposition.

Figure 22:
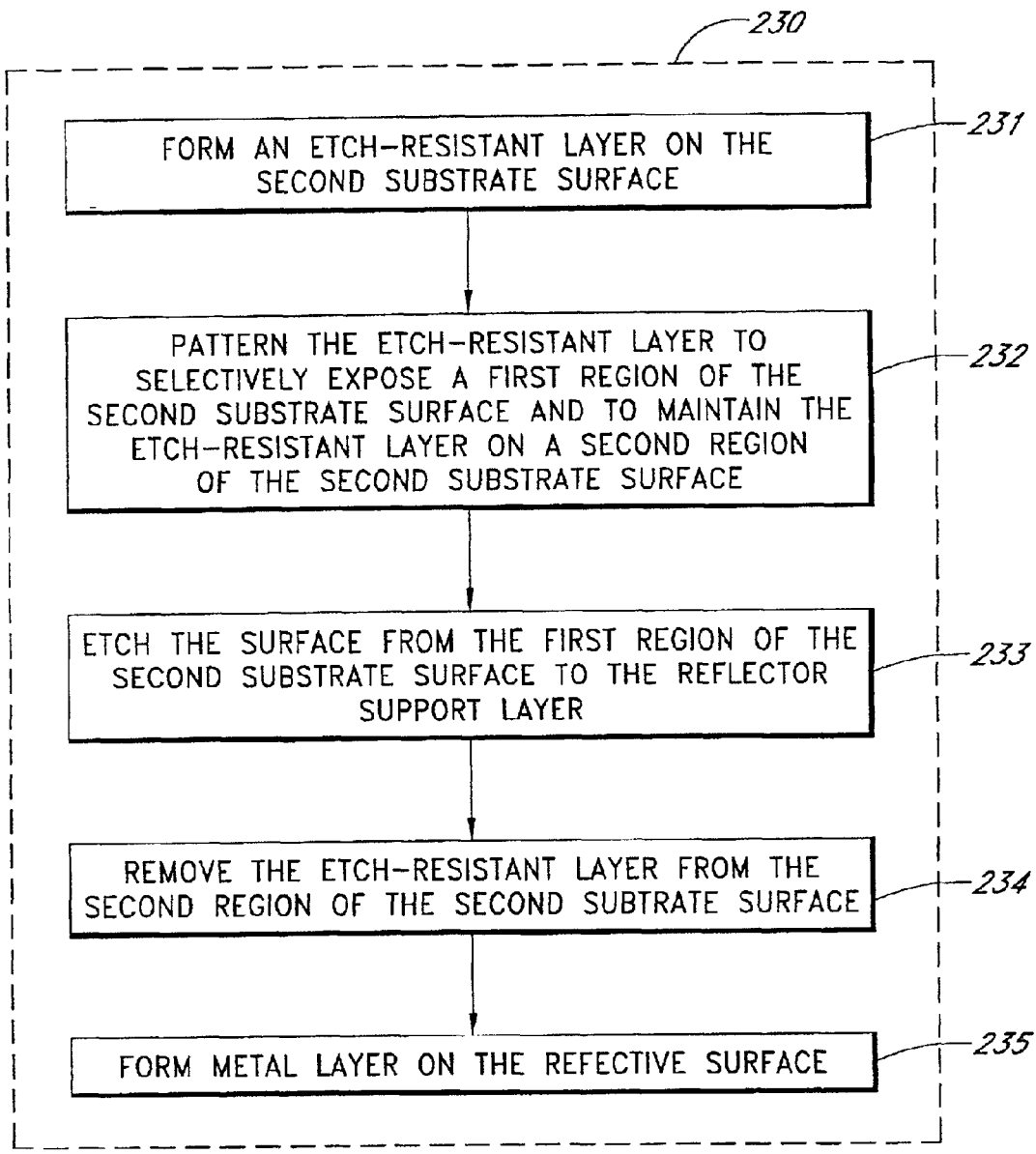
FIG. 22 is a flowchart of one embodiment for forming the support frame and at least one reflector.

A support frame 330 and at least one reflector 340 is formed by etching the substrate 300 from the second substrate surface 312 in the operational block 230, and FIG. 22 is a flowchart of one embodiment of the operational block 230. In this embodiment, the operational block 230 comprises forming an etch-resistant layer 331 on the second substrate surface 312 in an operational block 231. The operational block 230 of this embodiment further comprises patterning the etch-resistant layer 331 on the second substrate surface 312 in an operational block 232 to selectively expose a first region 332 of the second substrate surface 312 and to maintain the etch-resistant layer 331 on a second region 333 of the second substrate surface 312. The operational block 230 of this embodiment further comprises etching the substrate 300 from the first region 332 of the second substrate surface 312 to the reflector support layer 320 in an operational block 233, thereby forming sidewalls 334 of the support frame 330 and at least one reflective surface 335 of the reflector 340. The operational block 230 of this embodiment further comprises removing the etch-resistant layer 331 from the second region 333 of the second substrate surface 312 in an operational block 234.

Figure 19B:
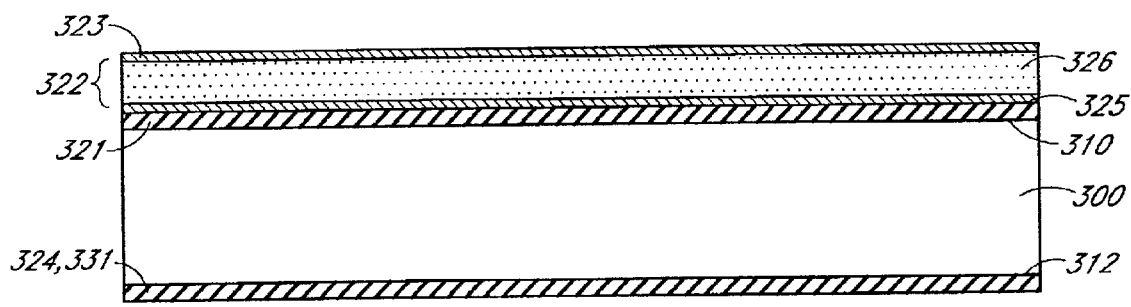

In certain embodiments, the etch-resistant layer 331 comprises silicon dioxide, and the etch-resistant layer 331 can be formed on the second substrate surface 312 while the silicon dioxide layer 321 is formed on the first substrate surface 310, as described above. In such an embodiment, the etch-resistant layer 331 comprises the silicon dioxide layer 324 on the second substrate layer 312, as schematically illustrated in FIG. 19B. Alternatively, other embodiments can utilize different materials for the etch-resistant layer 331, or can form the etch-resistant layer 331 in a separate step from the formation of the silicon dioxide layer 321 on the first substrate surface 310.

Figure 19C:
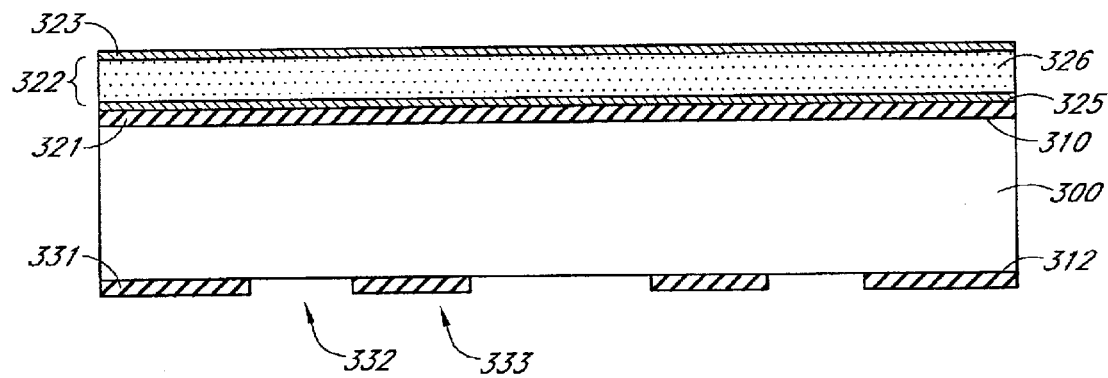

In certain embodiments, the patterning of the etch-resistant layer 331 can be performed using photolithography. In such an embodiment, a photoresist layer of approximately 10 μm thickness is spin-coated onto the etch-resistant layer 331, exposed to a pattern of light, and developed, thereby leaving a patterned photoresist layer on the etch-resistant layer 331. Using a standard wet etching technique, portions of the etch-resistant layer 331 can be removed, thereby selectively exposing the first region 332 of the second substrate surface 312 while maintaining the etch-resistant layer 331 on the second region 333 of the second substrate surface 312. FIG. 19C schematically illustrates a resulting structure corresponding to this embodiment. Persons skilled in the art can select appropriate photoresist layers and techniques in accordance with embodiments of the present invention.

Figure 19D:
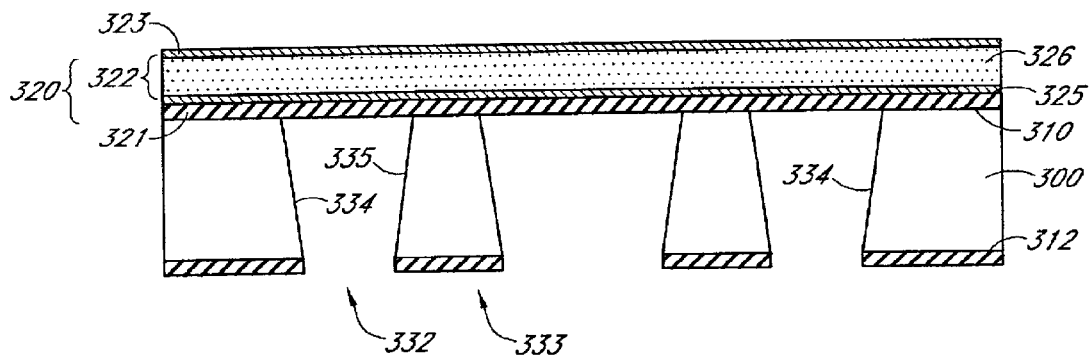

In certain embodiments, the etching of the substrate 300 from first region 332 of the second substrate surface 312 is performed using a deep-reactive ion etching (DRIE) process. One example of an etching process compatible with embodiments of the present invention is the "Bosch" process for anisotropically plasma etching silicon to provide laterally defined recess structures. This process is described in U.S. Pat. No. 5,501,893, entitled "Method of Anisotropically Etching Silicon," which issued to Laermer, et al., and which is incorporated in its entirety by reference herein. The Bosch process yields etched regions with long sidewalls. The etching of the substrate 300 continues until the reflector support layer 320 is reached, thereby forming the sidewalls 334 and the reflective surface 335. FIG. 19D schematically illustrates a resulting structure corresponding to this embodiment.

Figure 19E:
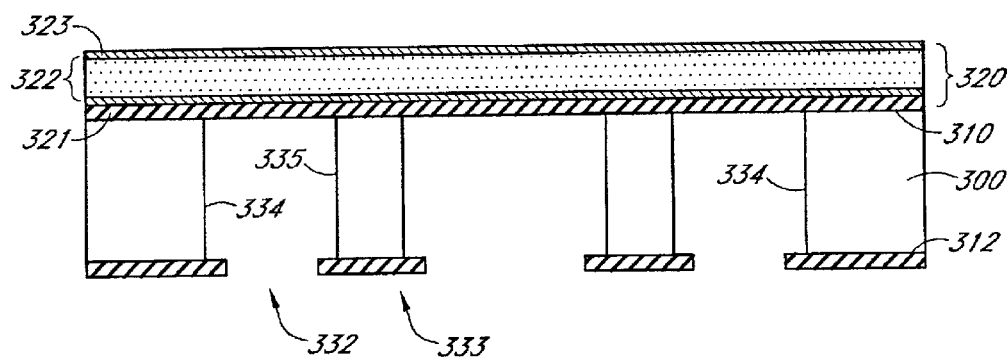

As schematically illustrated in FIG. 19D, the sidewalls 334 and reflective surface 335 resulting from the DRIE process in certain embodiments do not have the desired crystallographic orientation, so the etching of the substrate 300 can also include an anisotropic wet etch process subsequent to the DRIE process. An example of an anisotropic wet etch process compatible with embodiments of the present invention includes exposing the substrate 300 to an aqueous solution of tetramethylammonia hydroxide (TMAH) (e.g., approximately 15% TMAH in H$_2$O) while being held at approximately 90 C for approximately 3–3.5 hours. In alternative embodiments, a KOH solution or an ethylene diamine/pyrocatecol (EDP) solution can be used in the wet etch process. Persons skilled in the art can select other etching processes to form the sidewalls 334 and reflective surface 335 in accordance with embodiments of the present invention. As schematically illustrated in FIG. 19E, the anisotropic wet etch process yields generally straight sidewalls 334 and reflective surface 335 which are generally perpendicular to the reflector support layer 320.

Figure 19F:
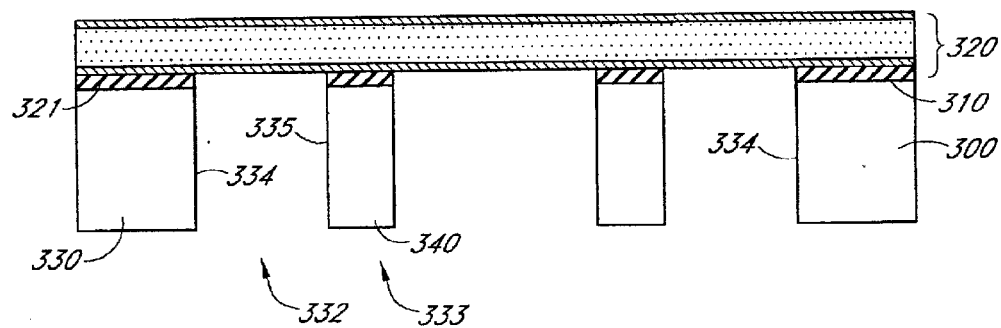

The formation of the support frame 330 and the reflector 340 includes removing the etch-resistant layer 331 from the second region 333 of the second substrate surface 312. In one embodiment, the removal of the etch-resistant layer 331 is performed by a wet etching process using a 5% HF aqueous solution. The wet etching process terminates at the protective layer 325 of the reflector support layer 320. In this way, the protective layer 325 protects the other layers of the reflector support layer 320. Besides removing the etch-resistant layer 331, in embodiments in which the reflector support layer 320 comprises a silicon dioxide layer 321, the silicon dioxide layer 321 of the reflector support layer 320 is also removed from a portion of the reflector support layer 320 corresponding to the first region 332 of the substrate 300. In alternative embodiments, the silicon dioxide layer 321 is removed during a separate process from the removal of the etch-resistant layer 331. The resulting structure is schematically illustrated in FIG. 19F.

Figure 19G:
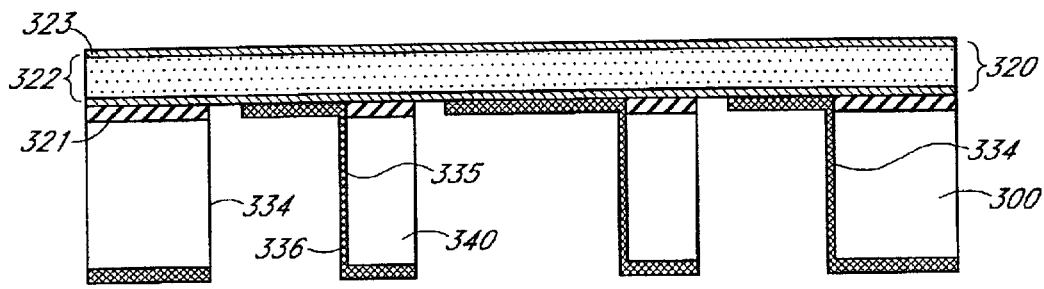

In certain embodiments, the formation of the support frame 330 and the reflector 340 further comprises forming a metal layer 336 on the reflective surface 335 of the reflector 340 in an operational block 235, as illustrated in the flowchart of FIG. 22. One example of such an embodiment includes deposition of aluminum onto the reflective surface 335. Another example of such an embodiment includes thermal evaporation of an adhesion layer onto the reflective surface 335 from the second substrate surface 312, followed by thermal evaporation of a gold layer onto the adhesion layer from the second substrate surface 312. The adhesion layer can comprise various materials, examples of which include, but are not limited to chromium and titanium. In order to deposit the metal layer 336, the substrate 300 is typically tilted with respect to the thermal evaporation direction by approximately 10°. These thermal evaporation processes are typically performed in a vacuum chamber with a vacuum pressure of approximately $10^{-7}$ torr. As described above, the reflectivity and transmittance of the metal layer is a function of its thickness. In certain embodiments, the thickness of the chromium layer is approximately 150 Å and the thickness of the gold layer is approximately 0.2–0.5 μm. Examples of other materials for the metal layer 336 which are compatible with embodiments of the present invention include, but are not limited to, copper and aluminum. The resulting structure is schematically illustrated in FIG. 19G.

Figure 23:
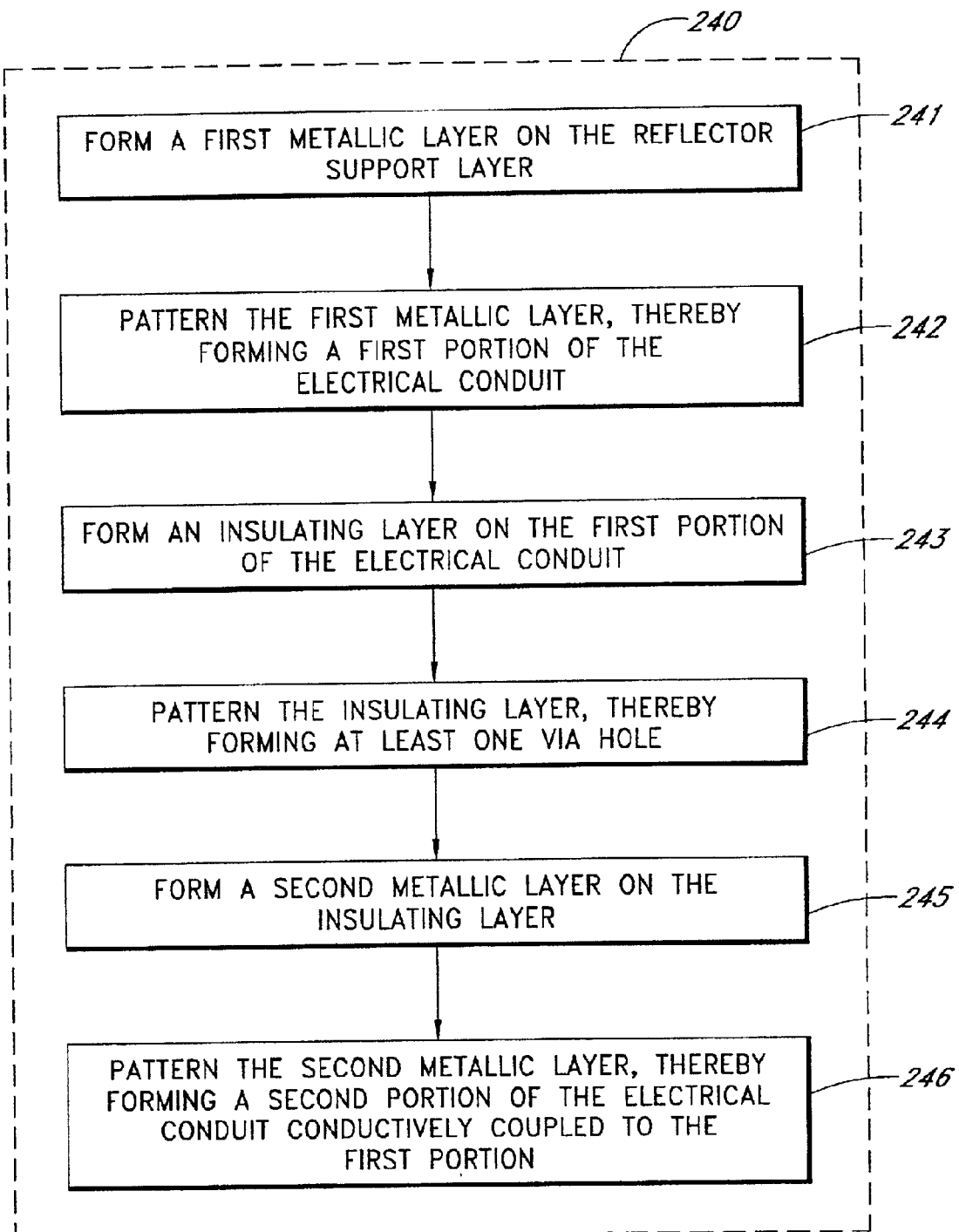
FIG. 23 is a flowchart of one embodiment for the formation of the electrical conduit on the reflector support layer.

One embodiment of the formation of the electrical conduit 350 on the reflector support layer 320 of the operational block 240 is illustrated in the flowchart of FIG. 23. This embodiment comprises forming a first metallic layer 341 on the reflector support layer 320 in an operational block 241. This embodiment further comprises patterning the first metallic layer 341, thereby forming a first portion 342 of the electrical conduit 350, in an operational block 242. This embodiment further comprises forming an insulating layer 343 on the first portion 342 of the electrical conduit 350 in an operational block 243, and patterning the insulating layer 343, thereby forming at least one via hole 344 to the first portion 342 of the electrical conduit 350 in an operational block 244. This embodiment further comprises forming a second metallic layer 345 on the insulating layer 343 in an operational block 245, and patterning the second metallic layer 345, thereby forming a second portion 346 of the electrical conduit 350 in an operational block 246. The second portion 346 of the electrical conduit 350 is conductively coupled to the first portion 342 of the electrical conduit 350 through the via hole 344 of the insulating layer 343.

Figure 19H:
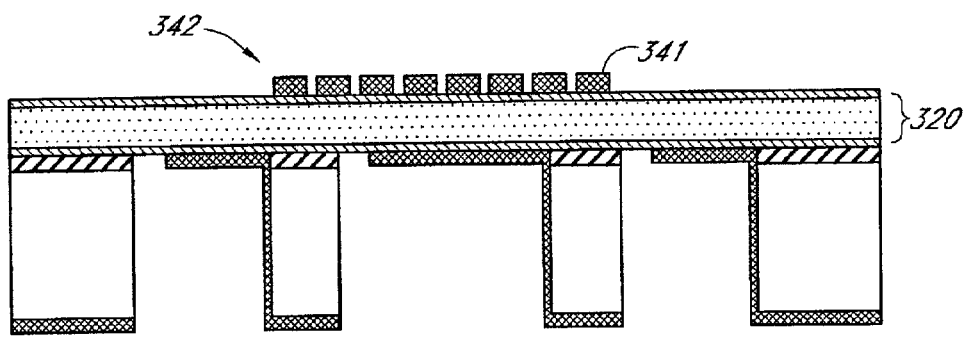

In certain embodiments, the formation of the first metallic layer 341 on the reflector support layer 320 of the operational block 241 includes depositing a chromium layer on the reflector support layer 320 by thermal evaporation and depositing a gold layer on the chromium layer by thermal evaporation. The first metallic layer 341 then comprises a chromium layer and a gold layer. Typically, the thickness of the chromium layer is approximately 100 Å, and the thickness of the gold layer is approximately 1 μm. Using standard photolithographic processes, the first metallic layer 341 can be patterned to form the first portion 342 of the electrical conduit 350 in the operational block 242. In certain embodiments, the patterning of the first metallic layer 341 can be followed by other processes, such as electroplating or electroless deposition, to increase the metal thickness and thereby decrease the resistance. Such processes can require selective masking of other metal portions of the module 32. Persons skilled in the art are able to configure photolithographic or other processes to form the first portion 342 in accordance with embodiments of the present invention. In certain embodiments, the first portion 342 of the electrical conduit 350 has a generally spiral configuration. The resulting structure is schematically illustrated in FIG. 19H.

Figure 19I:
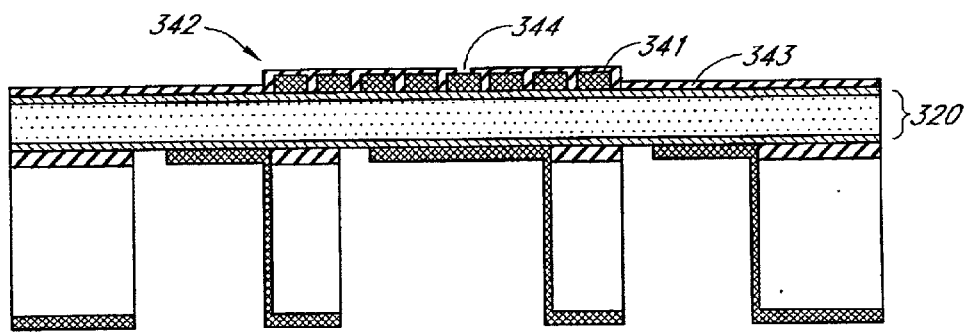

In certain embodiments, the insulating layer 343 comprises silicon dioxide, and the insulating layer 343 is formed in the operational block 243 by a LPCVD process similar to that process which forms the silicon dioxide layer 321 of the reflector support layer 320 in the operational block 221. The thickness of the insulating layer 343 is approximately 1 μm. Using standard photolithographic processes, the insulating layer 343 can be patterned to form the via hole 344 to the first portion 342 of the electrical conduit 350. Persons skilled in the art are able to configure photolithographic processes in accordance with embodiments of the present invention. The resulting structure is schematically illustrated in FIG. 19I.

In certain embodiments, the formation of the second metallic layer 345 on the insulating layer 343 of the operational block 245 includes depositing a chromium layer on the insulating layer 343 and a gold layer on the chromium layer by thermal evaporation as described above in relation to the deposition of the first metallic layer 341. The second metallic layer 345 then comprises a chromium layer and a gold layer. Typically, the thickness of the chromium layer is approximately 100 Å, and the thickness of the gold layer is approximately 1.2 μm. Using standard photolithographic processes, the second metallic layer 345 can be patterned to form the second portion 346 of the electrical conduit 350 in the operational block 246. In certain embodiments, the patterning of the second metallic layer 345 can be followed by other processes, such as electroplating or electroless deposition, to increase the metal thickness and thereby decrease the resistance. Such processes can require selective masking of other metal portions of the module 32. Persons skilled in the art are able to configure photolithographic or other processes to form the second portion 346 in accordance with embodiments of the present invention.

Figure 19J:
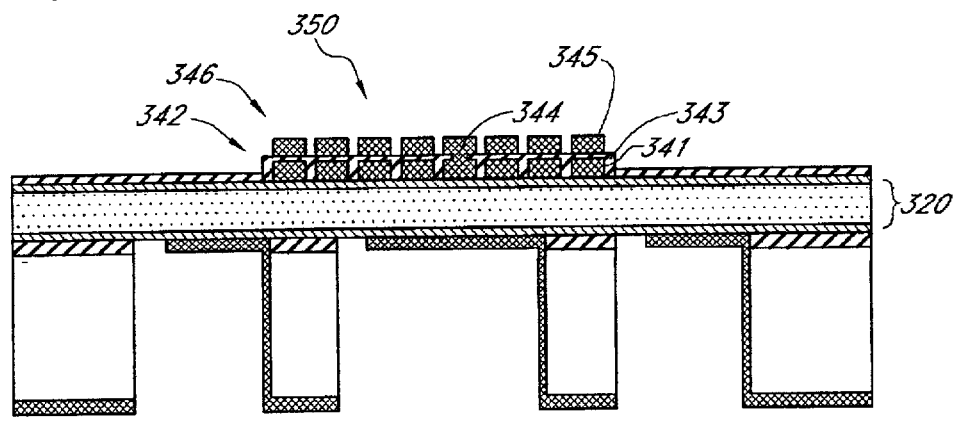

In addition, the via hole 344 is filled with metallic material such that the second portion 346 of the electrical conduit 350 is conductively coupled to the first portion 342 of the electrical conduit 350. In certain embodiments, the second portion 346 of the electrical conduit 350 has a generally spiral configuration. In such an embodiment in which the electrical conduit 350 is part of a magnetic actuator, the direction of current through the spiral of the first portion 342 and the spiral of the second portion 346 is configured so as not to generate forces which effectively cancel each other out. The resulting structure is schematically illustrated in FIG. 19J.

Figure 19K:
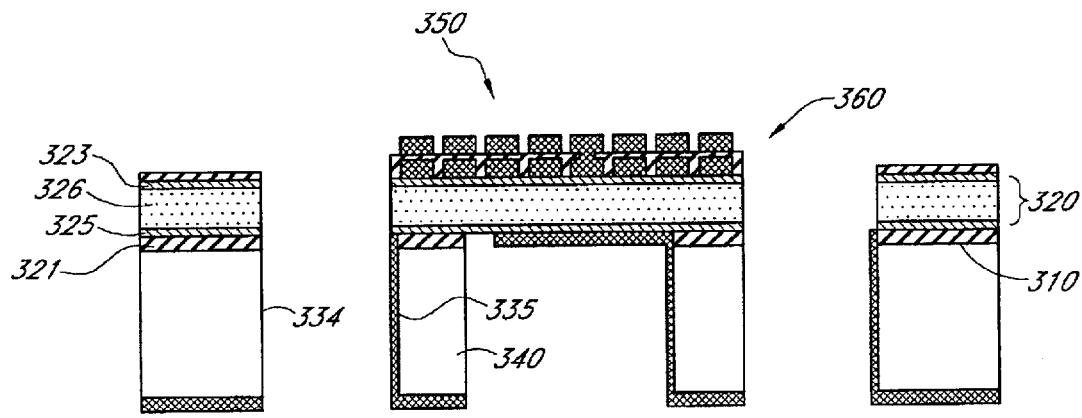

In certain embodiments, the formation of the reflector support 360 of the operational block 250 is performed by etching the reflector support layer 320 from the first substrate surface 310. Using standard photolithographic processes, a patterned photoresist layer can be formed on the reflector support layer 320, the pattern defining the reflector support 360, including any flaps 52 or couplers 54 which comprise the reflector support 360. In embodiments in which the reflector support layer 320 comprises a silicon dioxide layer 321, a protective layer 325 comprising silicon nitride, a polysilicon layer 326, and an insulating layer 323, a plasma etch process can be used. In addition, the portion of the metal layer 336 on the reflector support layer 320 between the sidewalls 334 and the reflective surface 335 can be removed by a wet etch process. Persons skilled in the art are able to configure photolithographic processes in accordance with embodiments of the present invention. The resulting structure is schematically illustrated in FIG. 19K, the structure comprising a reflector support 360 with a reflector 40, a compensation structure 41, and an electrical conduit 350.

Various additional alternative embodiments are compatible with the present invention. For example, certain embodiments of the formation of the substratum layer 322 can omit the protective layer 325, thereby forming the polycrystalline silicon layer 326 on the silicon dioxide layer 321. In certain other embodiments, the reflector support layer 320 on the first substrate surface 310 is protected from being etched during the anisotropic wet etch process during the formation of the support frame 330 and reflector 340 of the operational block 230. In such embodiments, the reflector support layer 320 can be first coated with a protective material, such as Cytop®, an amorphous fluorocarbon polymer which is produced by Asahi Glass Co. of Tokyo, Japan. After the anisotropic wet etch process is completed, the protective material is removed.

During the formation of modules 32 with a second reflector surface 110 in other alternative embodiments, the metal layer can also be formed on the opposite surfaces of the reflector 40 and/or the compensation structure 41 during the operational block 234. Typically, this metal layer is also formed using standard metal evaporation techniques once the substrate 300 and evaporator are re-oriented to deposit metallic material onto the desired surfaces.

In alternative embodiments in which the formation of the insulating layer 343 also forms silicon dioxide residue on the sidewalls 334 or the reflective surfaces 335, a wet etch process can be used to remove the silicon dioxide residue from these surfaces. The insulating layer 343 on the first portion 342 of the electrical conduit 350 is typically protected from the wet etch process by a layer of photoresist. Still other alternative embodiments of the method 200 include the formation of the metal layer 336 on the reflective surface 335 of the reflector 340 after the formation of the electrical conduits 350, thereby avoiding the possibility of the silicon dioxide residue being formed on the metal layer 336 of the reflective surface 335.

In still other alternative embodiments, the substrate 300 can be provided with an etch stop layer which comprises a portion of the reflector support layer 320. For example, the substrate 300 can comprise a silicon-on-insulator wafer which comprises a silicon wafer with a subsurface silicon dioxide layer which serves as the etch stop layer. In another example, a boron diffusion layer in the substrate 300 can serve as the etch stop layer. In such embodiments, the reflector support layer 370 can further comprise an epitaxial silicon layer formed on the first substrate surface 310. The support frame 330 and reflector 340 are formed by etching the substrate 300 from the second substrate surface 312 to the etch stop layer. The reflector support layer 320 of such embodiments can also comprise an insulating layer, such as silicon nitride, formed on the first substrate surface 310.

In certain alternative embodiments, the reflector driver 60 receives and is responsive to an electrical signal to selectively move the reflector 40 of a module 32. In such embodiments, the electrical signal can comprise a voltage which charges portions of a reflector driver 60 configured to utilize electrostatic forces to move the reflector 40. In still other embodiments, the reflector 40 can move to the second position 64 when electrical current is applied to the reflector driver 60, and can move to the first position 62 when electrical current is not applied to the reflector driver 60. In such embodiments, the flap 52 can be given an initial displacement by depositing a magnetic material, such as permalloy, on the flap 52.

Typically, multiple MEMS devices, such as the apparatus 10 described herein, are fabricated on the same wafer substrate to take advantage of economies of scale. To separate the MEMS devices from one another, the wafer substrate is diced and separated into chips, each of which comprises at least one of the MEMS devices. However, MEMS devices also typically contain various fragile components, such as the flaps 52, cantilevers 55, and reflectors 40 of the apparatus 10 described herein. These MEMS components are often damaged by the standard processes of dicing and separating the wafer substrate into chips, thereby reducing the yield of MEMS devices obtained from a given wafer substrate.

Previous attempts to improve the yield of MEMS devices from diced and separated wafer substrates have included the addition of a photoresist layer to the wafer substrate, thereby covering the MEMS devices and providing structural support during the dicing and separating processes. However, the application of a photoresist layer includes a spin coating method, which induces forces and stresses which can also damage fragile MEMS devices. Spin coating also is inefficient for large area substrates and the use of photoresist materials leads to environmental, health, and safety issues. In addition, photoresist layers typically are not conformal and have poor step coverage, especially when applied to high aspect ratio structures such as the reflectors 40 of the apparatus 10 described herein.

In certain embodiments of the present invention, the method 200 of fabricating the module 32 further comprises forming a conformal layer 370 by depositing a polymeric material in a vapor phase onto the substrate 300 from the second substrate surface 312 in an operational block 260. One example of a polymeric material compatible with the present invention includes, but is not limited to, parylene. Parylene is the generic name for members of a unique family of thermoplastic polymers that are deposited by using the dimer of para-xylylene (di-para-xylylene, or DPXN). Parylene can be deposited under vacuum conditions from a vapor phase at room temperature. There are three types of commercially available parylene. The basic member of the series is poly-para-xylylene (also referred to as Parylene N), a linear and highly crystalline polymer which exhibits a low dissipation and high dielectric strength. A second type, Parylene C, has para-xylylene monomers which have a chlorine atom replacing one of the aromatic hydrogen atoms in Parylene N. Parylene C also has a low permeability to moisture and other corrosive gases. Parylene D, the third member of the series, also has para-xylylene monomers, but with two chlorine atoms replacing two aromatic hydrogen atoms in the monomer of Parylene N. Parylene D has similar properties to Parylene C, with the ability to withstand higher temperatures. The chemical structure of parylene, its physical properties, and various deposition and patterning techniques are provided in more detail in "Integrated Parylene Micro Electro Mechanical Systems (MEMS)," doctoral thesis of Xuan-Qi Wang from California Institute of Technology, Pasadena, Calif., 2000, which is incorporated in its entirety by reference herein.

Figure 24:
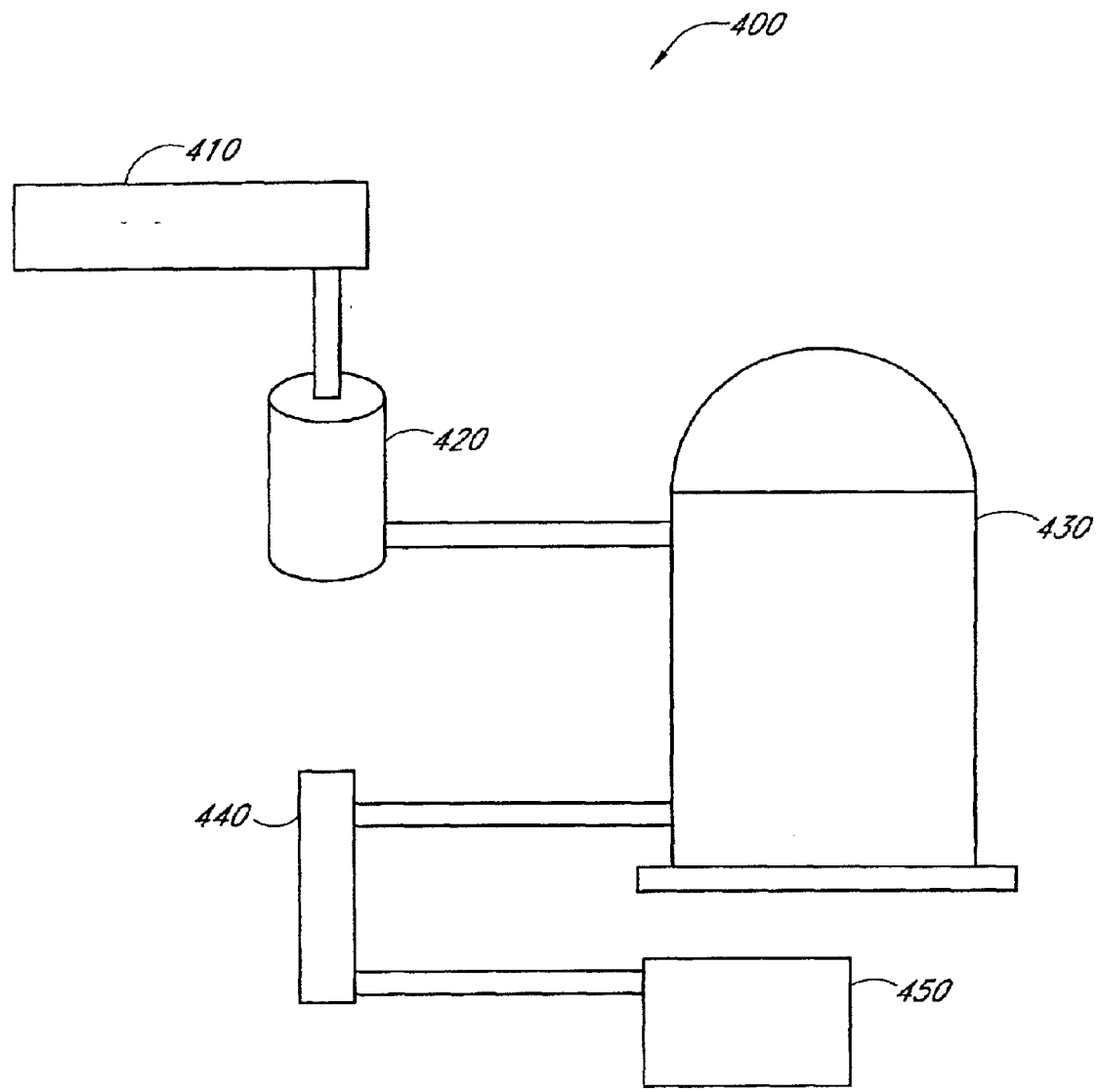
FIG. 24 schematically illustrates an exemplary deposition system for forming a conformal layer in accordance with embodiments of the present invention.
Figure 25:
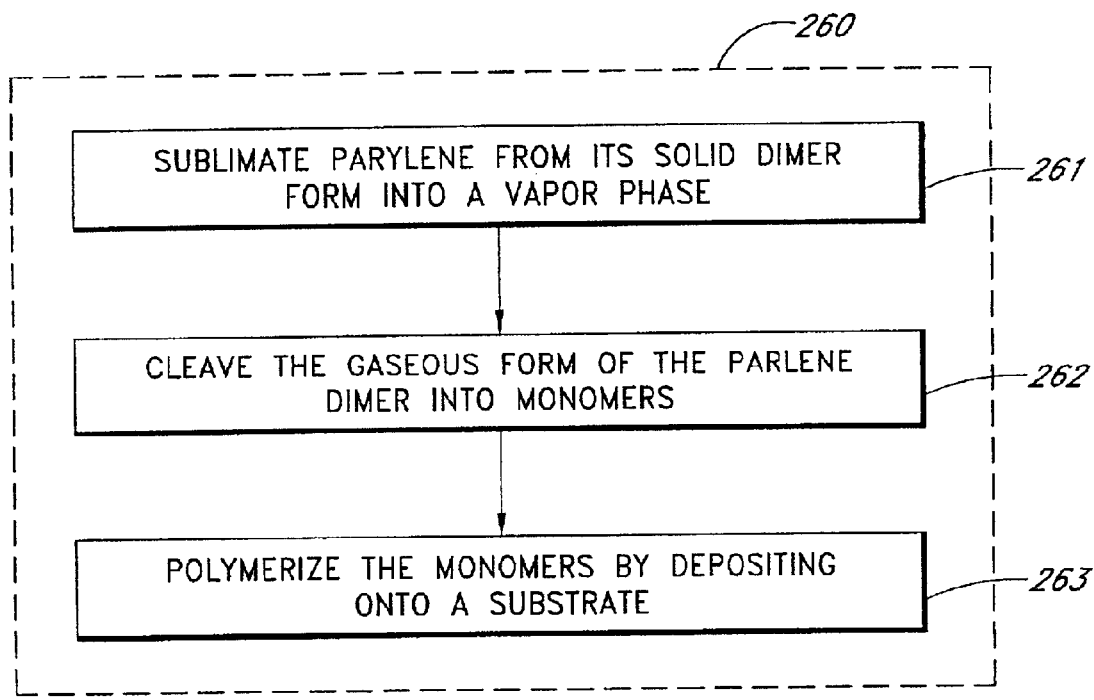
FIG. 25 is a flowchart of one embodiment for the deposition of parylene onto the substrate.

FIG. 24 schematically illustrates an exemplary deposition system 400 for forming a conformal layer 370 by depositing a polymeric material in a vapor phase onto the substrate 300 in accordance with embodiments of the present invention. The deposition system schematically illustrated in FIG. 24 comprises a sublimator 410, a pyrolysis chamber 420, a deposition chamber 430, a cold trap 440, and a vacuum pump 450. In certain embodiments, as illustrated in the flowchart of FIG. 25, the deposition of parylene onto the substrate 300 of the operational block 260 comprises a sublimation process of an operational block 261 in which the parylene sublimates from its solid dimer form into a vapor phase. The sublimation process of the operational block 261 is accomplished in the sublimator 410 by the application of heat to solid parylene while under vacuum conditions. The temperature range for sublimation of parylene is typically between approximately 140 C and 170 C. The deposition of parylene of the operational block 260 further comprises a pyrolysis process of an operational block 262, in which the gaseous form of the parylene dimer is cleaved into monomers. The pyrolysis process of the operational block 262 is typically performed in a pyrolysis chamber 420 which is heated to above approximately 650 C. The deposition of parylene of the operational block 260 further comprises a polymerization process of an operational block 263 in which the gaseous parylene monomers are deposited onto the substrate and polymerized, which typically occurs at approximately room temperature in the deposition chamber 430. While the sublimation process of operational block 261 and pyrolysis process of operational block 262 are achieved by controlled temperatures, the final deposition rate during the polymerization process of operational block 263 is controlled by the pressure inside the deposition chamber. In certain embodiments, the cold trap 440 and vacuum pump 450 maintain the pressure inside the deposition chamber 430 during the polymerization process of operational block 263 between approximately 20 mtorr and 30 mtorr.

Parylene deposited in this manner yields thin films with a high degree of conformity; i.e., the parylene is deposited on the exposed surfaces at approximately the same rate. For all the types of parylene, the para-xylylene monomers are cross-linked into polymerized long-chain macromolecules to form a thin film which has anisotropic properties and high rigidity. Parylene is also inert, non-toxic, and non-hazardous. It emits no volatile organic compounds during storage, handling, or deposition. Parylene resists room temperature chemical attack and is insoluble in organic solvents up to approximately 150 C. Parylene films are also resistant to permeation by most solvents.

Figure 26A:
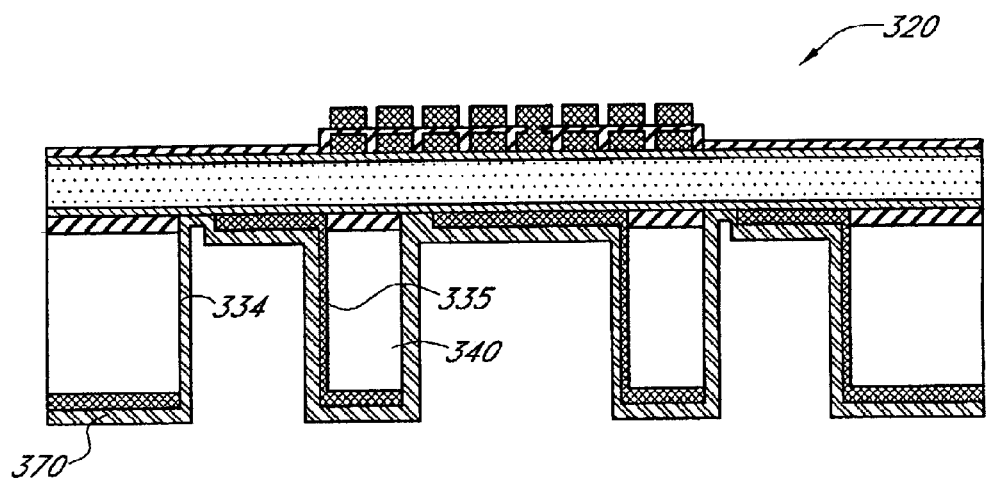
FIG. 26A schematically illustrates one embodiment of the conformal layer formed after the formation of the support frame, reflector, and electrical conduit, but before the formation of the reflector support.
Figure 26B:
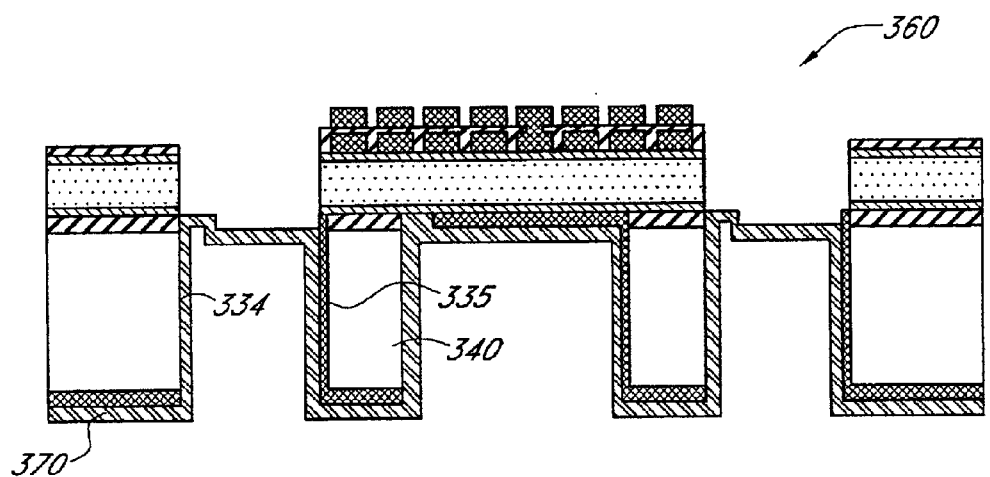
FIG. 26B schematically illustrates one embodiment of the conformal layer after the formation of the reflector support.

As schematically illustrated in FIG. 26A, in certain embodiments, the conformal layer 370 is formed on the substrate 300 after the formation of the support frame 330 and reflector 340 in the operational block 230, after the formation of the electrical conduit 350 in the operational block 240, but before the formation of the reflector support 360 in the operational block 250. The conformal layer 370 deposited from the second substrate surface 312 substantially covers the sidewalls 334, reflective surface 335, metal layers 336, and the reflector support layer 320. FIG. 26B schematically illustrates the conformal layer 370 after the formation of the reflector support 360 in the operational block 250. While the reflector support layer 320 has been etched away from the first substrate surface 310, the conformal layer 370 remains substantially intact. Since the reflector support 360 is formed subsequently to forming the conformal layer 370, the conformal layer 370 provides protection to the reflector 40 from the etching of the reflector support layer 320.

The conformal layer 370 then provides structural support for the reflector support 360 during the dicing and separating of the substrate 300 into individual chips in the operational block 264. The conformal layer 370 is then removed from the modules 32 in an operational block 265, resulting in the structure schematically illustrated in FIG. 19K. In certain embodiments, the conformal layer 370 is removed by a dry plasma etch process which utilizes an oxygen plasma applied to the conformal layer 370 from the second substrate surface 312 for approximately 200 minutes, and from the first substrate surface 310 for approximately 80 minutes.

Figure 27:
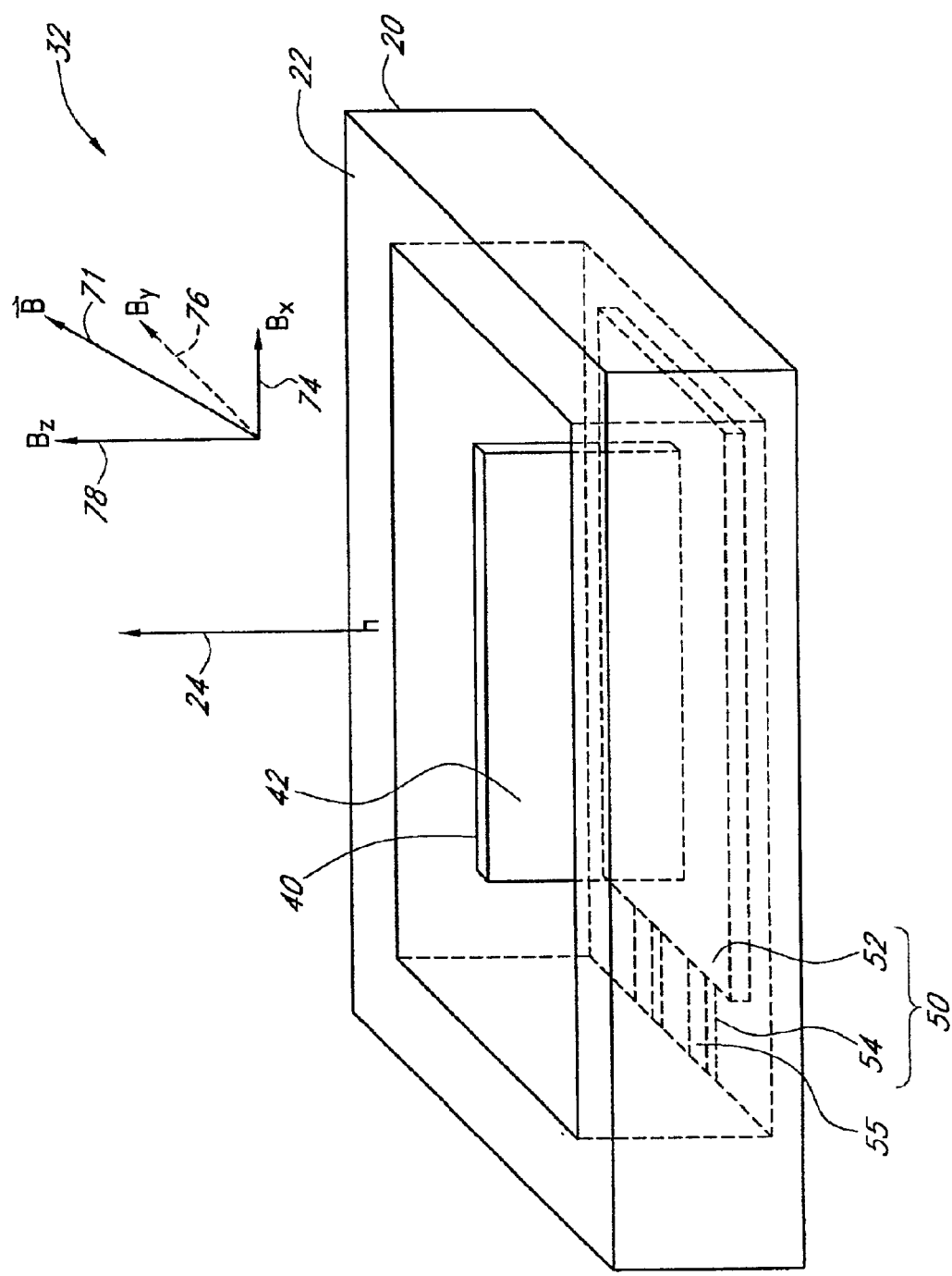
FIGS. 27 and 28 schematically illustrate a module for at least partially intercepting a light beam propagating along a beam path in accordance with an alternative embodiment of the present invention.
Figure 28:
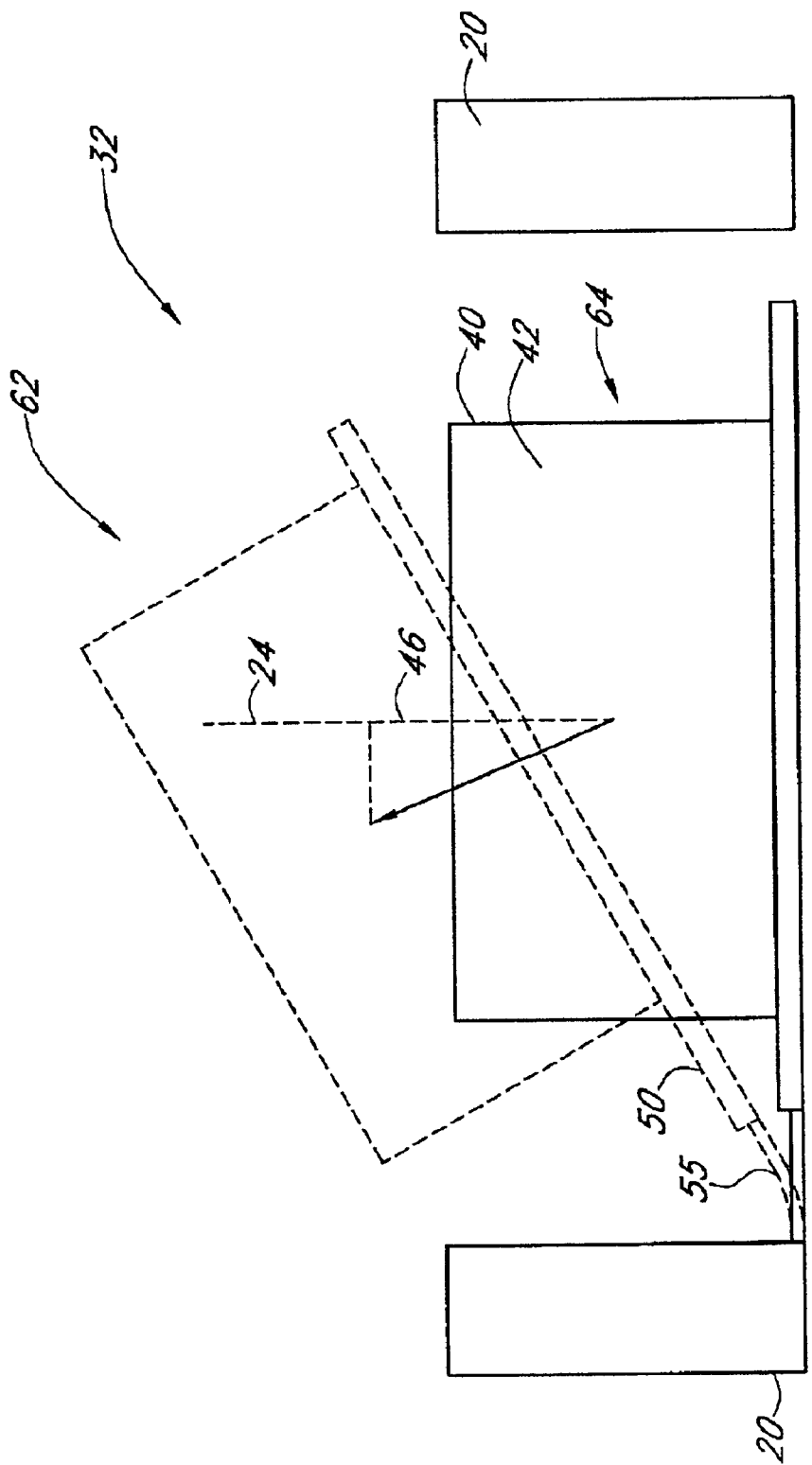

In the embodiment schematically illustrated in FIGS. 27 and 28, the reflector 40 is positioned above the flap 52, thereby allowing the reflector 40 to move to the first position 62 without the flap 52 passing through any of the beam paths 14. This embodiment avoids extraneous reflections that may be created by the flap 52 passing through the light beam 12.

Figure 29A:
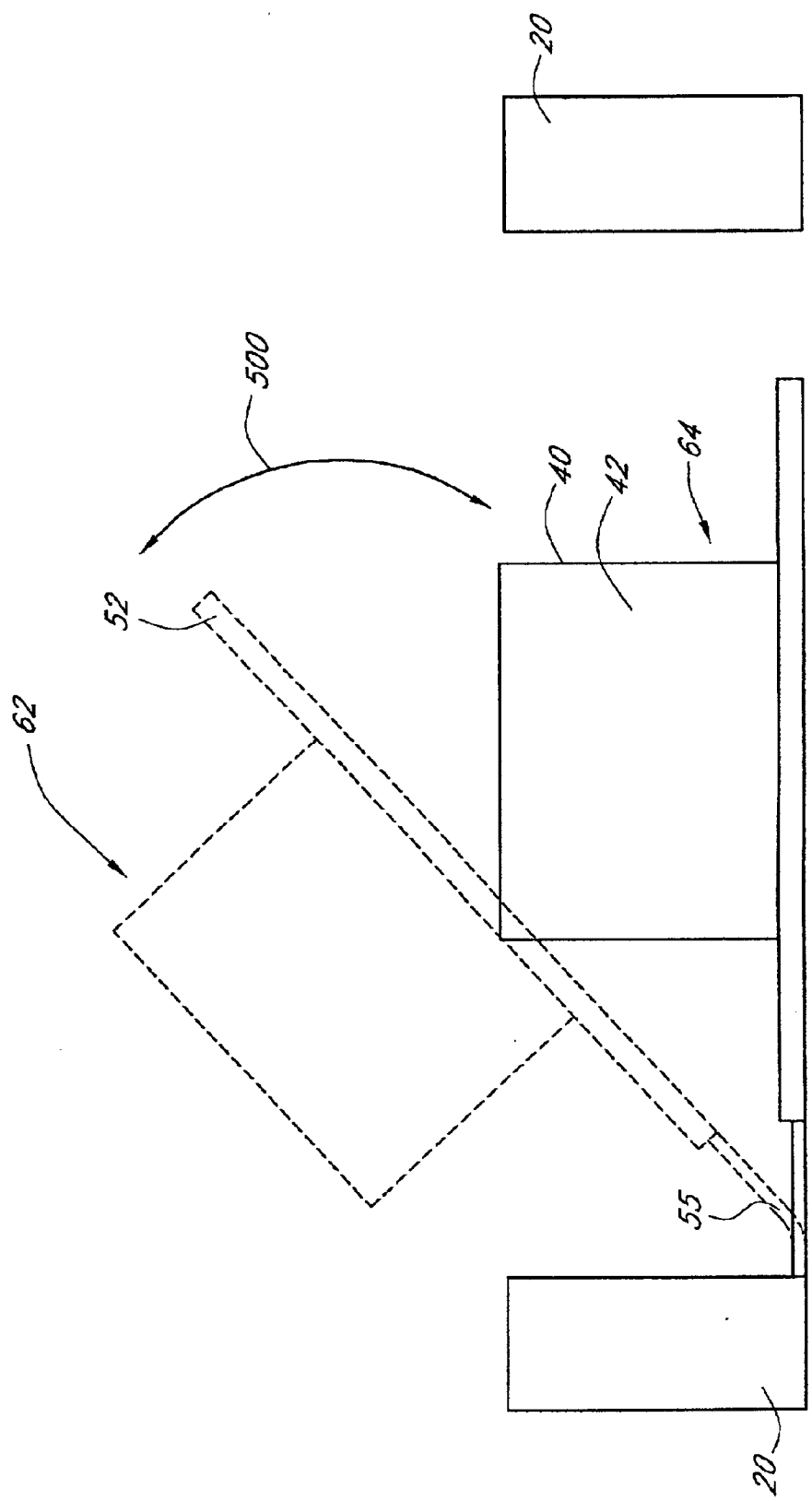
FIG. 29A schematically illustrates motion of a reflector in the pitch mode.
Figure 29C:
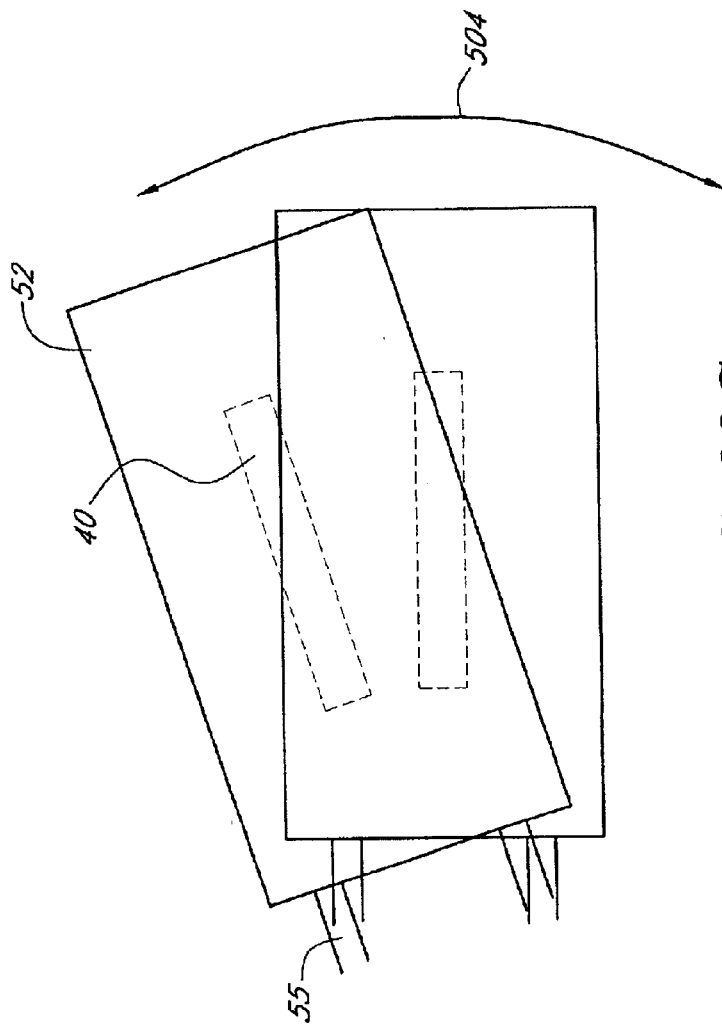
FIG. 29C schematically illustrates motion of a reflector in the yaw mode.
Figure 29B:
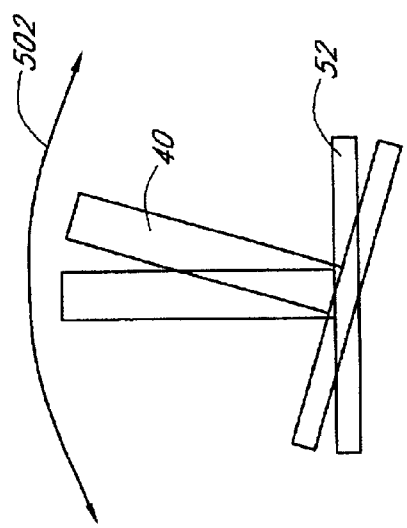
FIG. 29B schematically illustrates motion of a reflector in the roll mode.

As illustrated in FIGS. 29A, 29B, and 29C, the couplers 54 allow the reflector 40 to move with respect to the substrate 20 in three distinct modes. FIG. 29A illustrates movement of the reflector 40 in the pitch mode 500. When the reflector 40 has motion in the pitch mode 500, the plane defined by the reflector surface 42 remains substantially perpendicular to the plane defined by the substrate surface 22. FIG. 29B illustrates movement of the reflector 40 in the roll mode 502. When the reflector 40 has motion in the roll mode 502, the reflector 40 and the flap 52 both rotate around an axis that is substantially parallel to both the plane defined by the reflector surface 42 and the plane defined by the substrate surface 22. Finally, FIG. 29C illustrates movement of the reflector 40 in the yaw mode 504. When the reflector 40 has motion in the yaw mode, the reflector 40 and the flap 52 both rotate around an axis that is substantially perpendicular to the plane defined by the substrate surface. The reflector 40 may move in one of these modes, in any two of these modes simultaneously, or in all three modes simultaneously.

Figure 30:
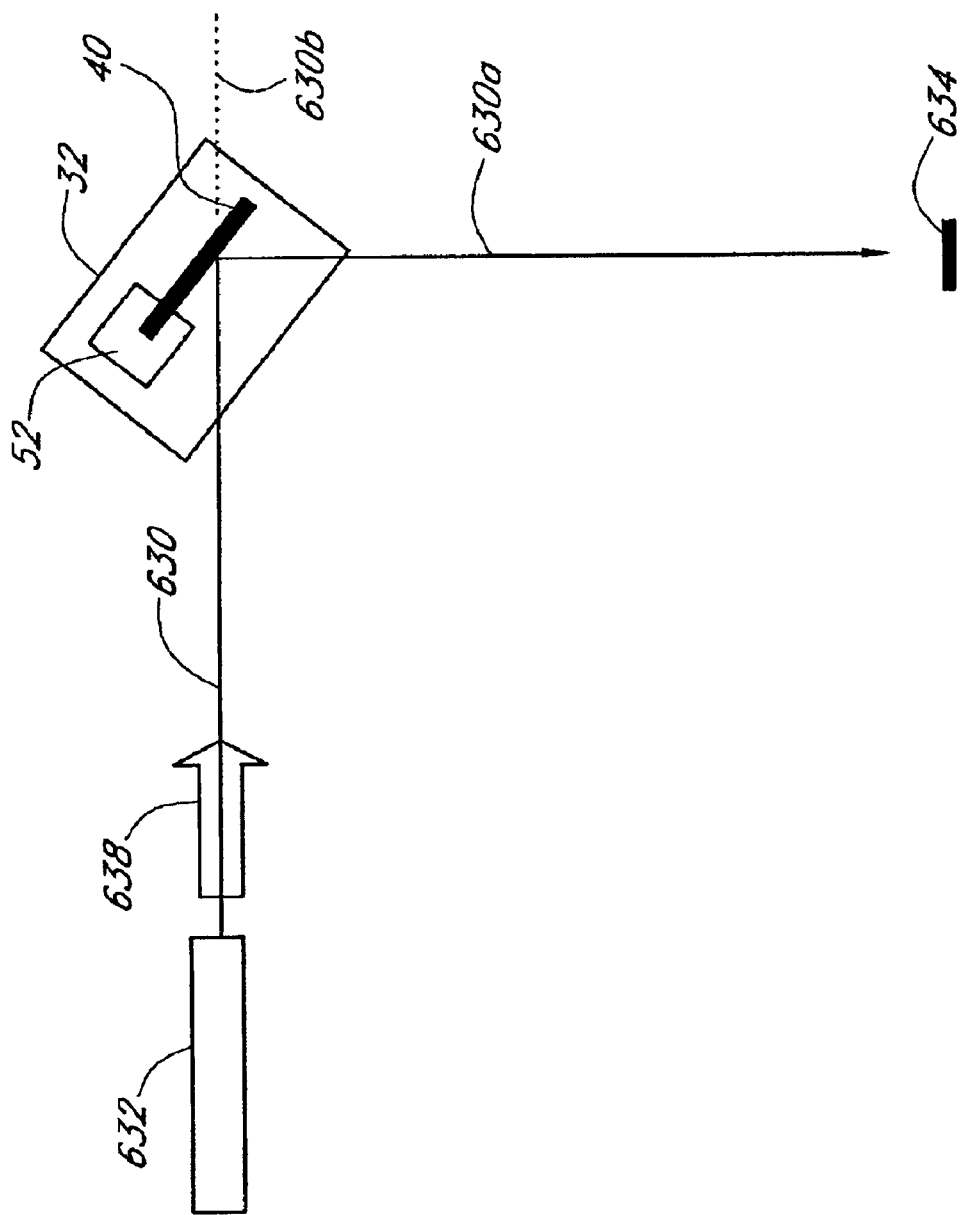
FIG. 30 schematically illustrates a layout in accordance with an embodiment of the present invention.

The modes in which a reflector 40 is moving can be determined by using the embodiment schematically illustrated in FIG. 30. In this embodiment, a light source 632 capable of producing a collimated light beam 638 is positioned such that the beam path 630 passes over a module 32. When the reflector 40 is in the first position 62 (i.e., intersecting the beam path 630), the collimated light beam 638 is reflected from the reflector 40 along beam path 630*a*, where it impinges on a receiving device 634. When the reflector 40 is in the second position 64 (i.e., not intersecting the beam path 630), the collimated light beam 638 passes over the reflector 40 and continues along beam path 630*b*. By monitoring the projection of the collimated light beam 638 onto the receiving device 634, it is possible to determine the modes in which the reflector 40 is moving.

Figure 31A:
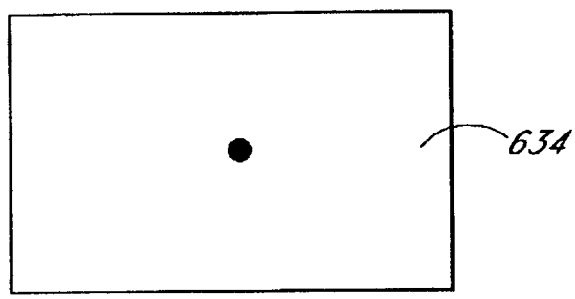
FIGS. 31A–D schematically illustrate the path of a light beam reflected from a reflector subject to pitch, roll, and/or yaw motion.

If the reflector 40 has motion only in the pitch mode 500, the reflector 40 will move substantially perpendicular to the beam path 630 and the collimated light beam 638 will remain substantially stationary on the receiving device 634. FIG. 31A illustrates the beam path projected onto the receiving device 634 when the reflector 40 has motion only in the pitch mode 500.

Figure 31B:
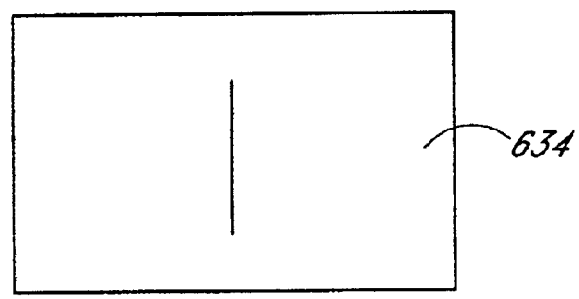

If the reflector 40 intersects the beam path 630 and has motion in the roll mode 502, the reflector 40 will cause the collimated light beam 638 to be deflected substantially perpendicular to the plane defined by the beam paths 630*a* and 630*b*. This motion will project a line of light onto the receiving device 634, which in certain embodiments is vertical, as illustrated in FIG. 31B. In such configurations, the reflector 40 can intersect the beam path 630 as a result of simultaneous motion in the pitch mode 500.

Figure 31C:
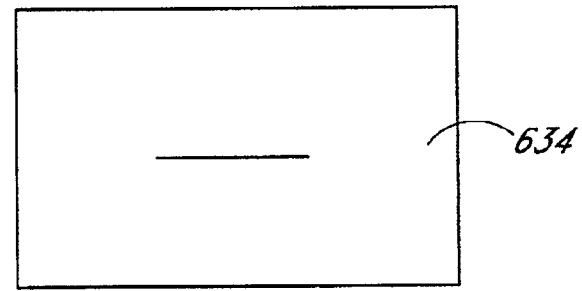

If the reflector 40 intersects the beam path 630 and has motion in the yaw mode 504, the reflector 40 will cause the collimated light beam 638 to be deflected substantially parallel to the plane defined by the beam paths 630*a* and 630*b*. This motion will project a line of light onto the receiving device 634, which in certain embodiments is horizontal, as illustrated in FIG. 31C. In such configurations, the reflector 40 can intersect the beam path 630 as a result of simultaneous motion in the pitch mode 500.

Figure 31D:
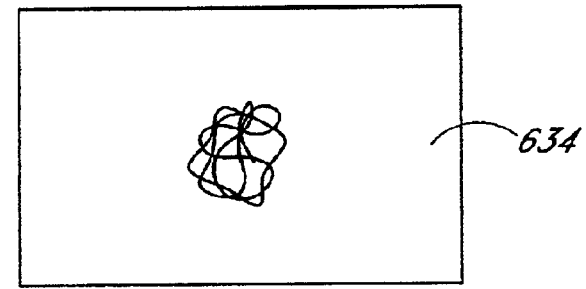

If the reflector 40 has simultaneous motion in the roll mode 502 and the yaw mode 504 while intersecting the collimated light beam 638, the reflector 40 will cause the light beam to be deflected with two components: one substantially perpendicular and one substantially parallel with respect to the plane defined by the beam paths 630a and 630b. This motion will result in superimposed deflections of the collimated light beam 638, projecting a corresponding pattern on the receiving device 634, as illustrated in FIG. 31D. In such configurations, the reflector 40 can intersect the beam path 630 as a result of simultaneous motion in the pitch mode 500.

In certain embodiments, the light source 632 produces a collimated light beam 638 in the visible portion of the electromagnetic spectrum, and the receiving device 634 is a screen from which the collimated light beam 638 can be detected visually. In other embodiments, the receiving device 634 comprises a position-sensitive detector. In still other embodiments, the receiving device 634 comprises a charge-coupled-device (CCD) camera. Either of these devices may be used to detect the path of the reflected collimated light beam 638. In alternate embodiments, the light source 632 produces a collimated light beam 638 in the infrared portion of the electromagnetic spectrum and the receiving device 634 may comprise, a screen used in conjunction with an infrared viewer, an infrared-sensitive screen, an infrared-sensitive position-sensitive detector, or an infrared-sensitive CCD camera, or other compatible devices. Persons skilled in the art can select an appropriate light source 632 and a corresponding receiving device 634 in accordance with various embodiments of the present invention.

In embodiments in which the module 32 is incorporated into an optical switch, the receiving device 634 can comprise an optical fiber adapted to further process or transmit the reflected collimated light beam 638. In such embodiments, motion of the reflector 40 in the pitch mode 500 can cause the reflector 40 to intercept and reflect a portion of or the entire incident light beam 12 to the optical fiber. If the reflector 40 of such embodiments has sufficient motion in either the roll mode 502 or the yaw mode 504, the incident light beam 12 can be reflected so that some or all of the reflected light beam is not received by the optical fiber of the receiving device 634. Furthermore, in embodiments in which the module 32 is incorporated into an array 30 comprising a plurality of modules 32 with a corresponding plurality of optical fibers adapted to receive the switched optical signal, motion of the reflector 40 in the yaw mode 504 can deflect the reflected light beam from an intended fiber to another fiber, thereby creating crosstalk between the fibers. Therefore, when the reflector 40 is moving in the pitch mode 500, motion of the reflector 40 in the roll mode 502 and in the yaw mode 504 is sought to be minimized. As used herein with regard to such embodiments, motion of the reflector 40 in the pitch mode 500 is referred to as "motion in the intended mode," while motions of the reflector 40 in the roll mode 502 or in the yaw mode 504 are referred to as "motion in an unintended mode." In other embodiments compatible with the present invention, the terms "intended mode" and "unintended mode" can refer to other modes of motion of the reflector 40.

As illustrated in FIG. 27, in certain embodiments the externally-applied magnetic field 71 can be described as having a $B_x$ component 74, a $B_y$ component 76, and a $B_z$ component 78 along three principal directions x, y, and z defined by the geometry of the module 32. The force F applied to the electrical conduit 72 is defined by the vector cross product of the current vector I and the external magnetic field vector B, and as described below, the three components of the externally-applied magnetic field 71 ($B_x$, $B_y$, $B_z$) can produce motion of the reflector 40 in the three modes (roll, pitch, yaw).

Figure 32A:
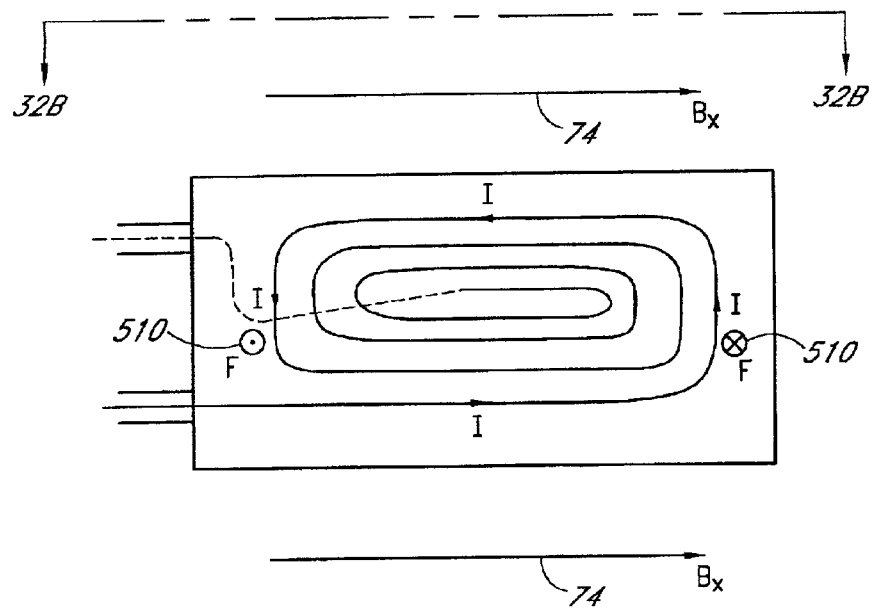
FIG. 32A schematically illustrates a first distribution of forces applied by a first external magnetic field component.
Figure 32B:
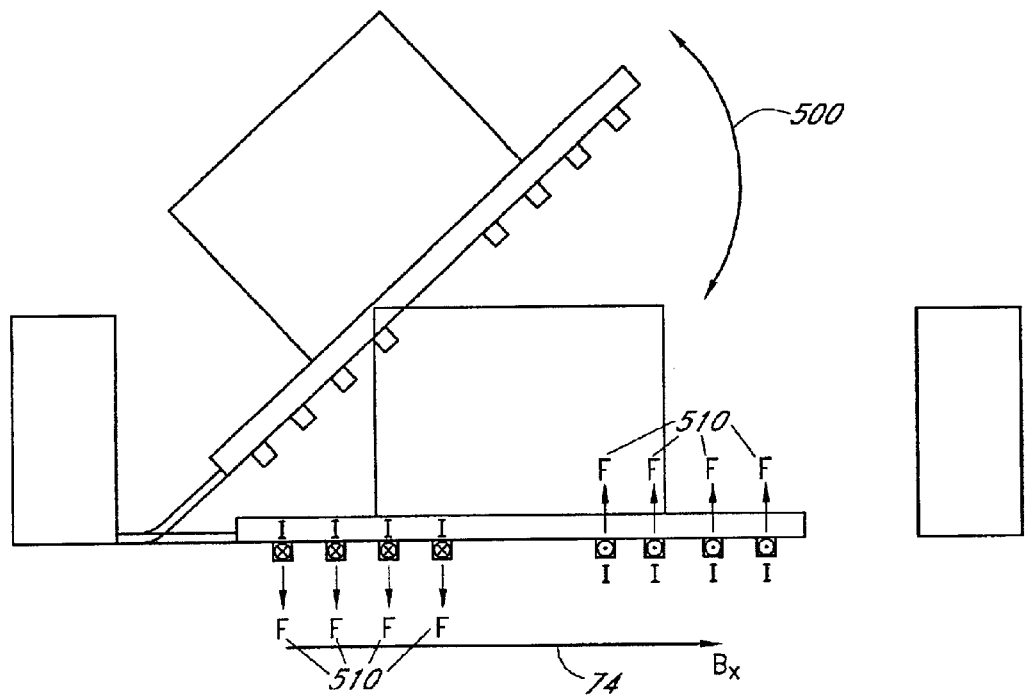
FIG. 32B schematically illustrates the motion of the reflector in the pitch mode.
Figure 33A:
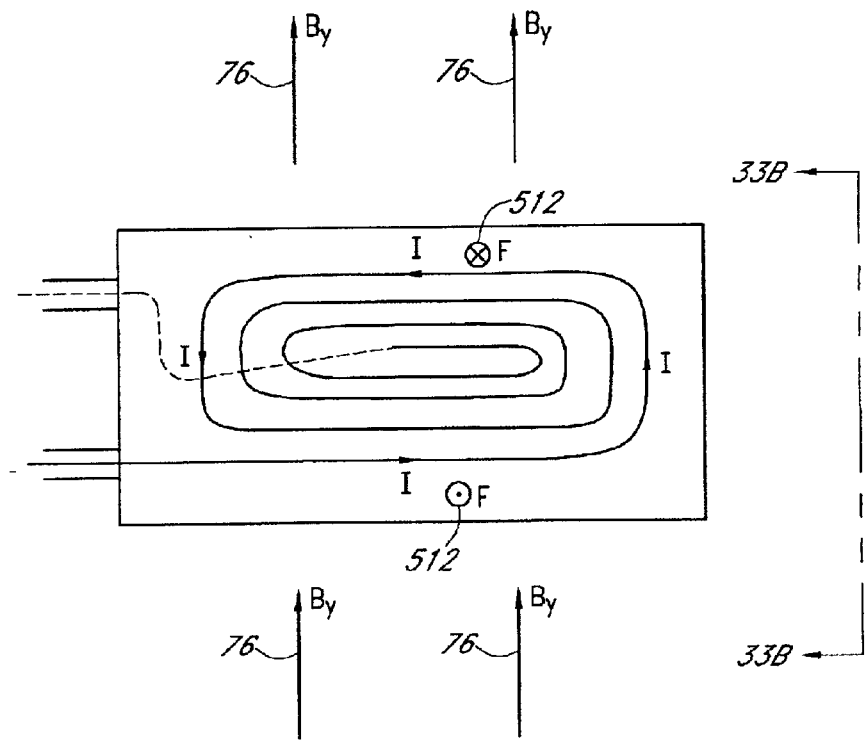
FIG. 33A schematically illustrates a second distribution of forces applied by a second external magnetic field component.
Figure 33B:
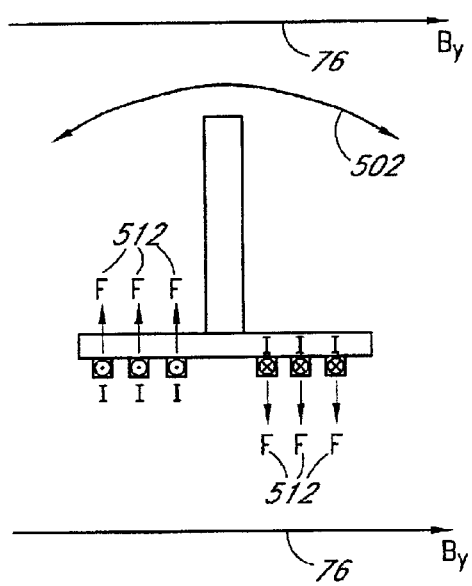
FIG. 33B schematically illustrates the motion of the reflector in the roll mode.
Figure 34A:
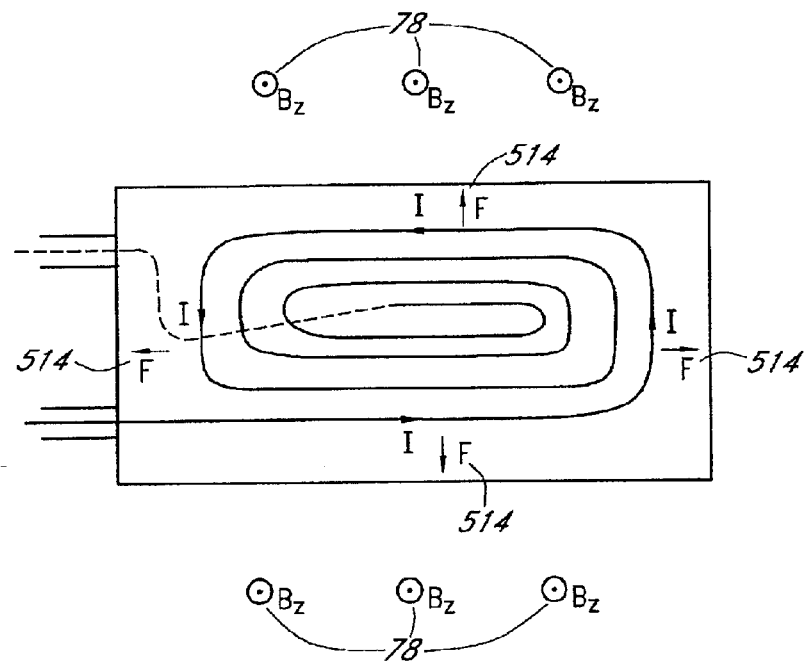
FIG. 34A schematically illustrates a third distribution of forces applied by a third external magnetic field component.
Figure 34B:
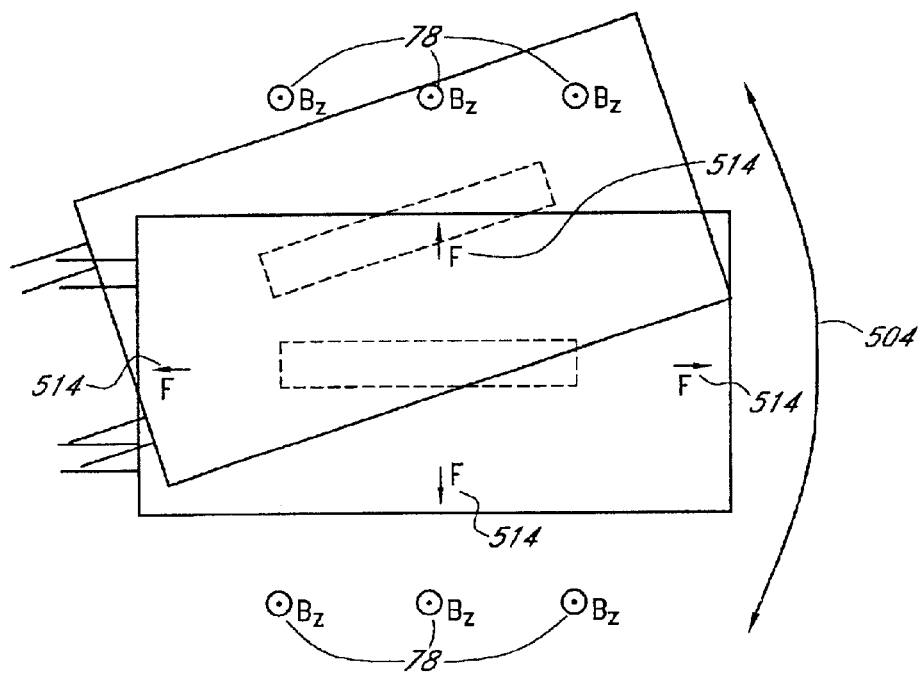
FIG. 34B schematically illustrates the motion of the reflector in the yaw mode.

As illustrated in FIGS. 32A–B, the $B_x$ component 74 of the externally-applied magnetic field 71 produces a distribution of forces 510 on the electrical conduit 72 resulting in motion of the reflector 40 in the pitch mode 500. As illustrated in FIGS. 33A–B, the $B_y$ component 76 of the externally-applied magnetic field 71 produces a distribution of forces 512 on the electrical conduit 72 resulting in motion of the reflector 40 in the roll mode 502. As illustrated in FIGS. 34A–B, the $B_z$ component 78 of the externally-applied magnetic field 71 produces a distribution of forces 514 on the electrical conduit 72. If the magnitude of the externally-applied magnetic field 71 in the $B_z$ direction is not uniform and symmetric across the electrical conduit 72, or if the current through the electrical conduit 72 is asymmetric or non-uniform, the resultant distribution of forces 514 on the electrical conduit 72 will be asymmetric or non-uniform, and the vector sum of the distribution of forces 514 will be non-zero. The resultant distribution of forces results in motion of the reflector 40 in the yaw mode 504. In addition, non-uniformities in the mechanical structure of the module 32 can produce motion of the reflector 40 in the yaw mode 504 even if the distribution of forces 514 on the electrical conduit 72 is symmetric and uniform. Examples of such structural non-uniformities include a non-uniform distribution of the mass of the flap 52 and/or reflector 40, or varying bending properties of the cantilevers 55.

As illustrated in FIGS. 32B, 33B and 34B, and as described above, passing a current through the electrical conduit 72 in the presence of the externally-applied magnetic field 71 produces a distribution of forces on the electrical conduit 72. If the current passed through the electrical conduit 72 is held constant (i.e., a DC current), and if the magnitude and orientation of the externally-applied magnetic field remains constant, the reflector 40 will be subjected to a constant distribution of forces, and will not move once it reaches a position where the forces on the reflector 40 are in equilibrium. Alternatively, if a sinusoidal current is passed through the electrical conduit 72 (i.e., an AC current), and the magnitude and orientation of the externally-applied magnetic field remains constant, the reflector 40 will oscillate around its equilibrium position (i.e., its position when no current is passed through the electrical conduit 72).

In certain embodiments, the position around which the reflector 40 oscillates when the AC current is passed through the electrical conduit 72 may be adjusted by superimposing a DC offset upon the AC current. In such embodiments, the current passing through the electrical conduit 72 may be adjusted to cause the reflector 40 to remain within the beam path 630 while still oscillating with motion in the pitch mode 500, roll mode 502, and/or yaw mode 504.

Figure 35:
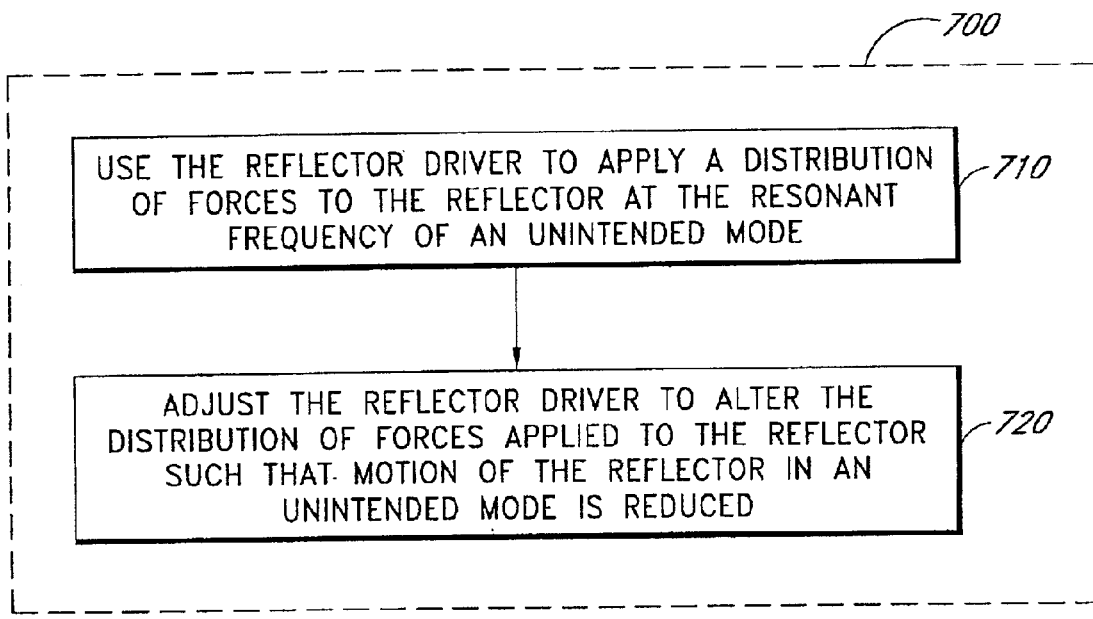
FIG. 35 is a flowchart of one embodiment for reducing movement of the reflector in an unintended mode during movement of the reflector in the intended mechanical mode.

FIG. 35 is a flowchart corresponding to a method 700 of reducing movement of a reflector 40 in an unintended mode during movement of the reflector 40 in an intended mode. The method 700 comprises an operational block 710 for using the reflector driver 60 to apply a distribution of forces to the reflector 40 at a resonant frequency of the unintended mode. The method 700 further comprises an operational block 720 for adjusting the reflector driver 60 to alter the distribution of forces applied to the reflector 40 such that motion of the reflector 40 in an unintended mode is reduced.

Figure 36:
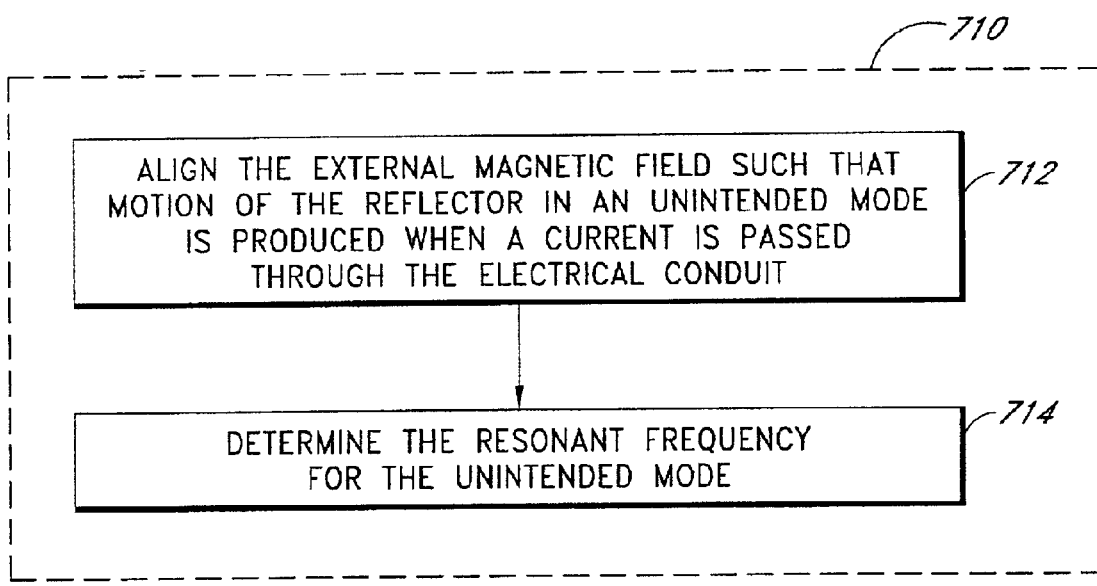
FIG. 36 is a flowchart of one embodiment for using the reflector driver to apply a distribution of forces to the reflector at the resonant frequency of an unintended mode.

FIG. 36 is a flowchart corresponding to one embodiment of the operational block 710 for using the reflector driver 60 to apply a distribution of forces to the reflector 40 at a resonant frequency of the unintended mode. In such embodiments, the operational block 710 comprises aligning the external magnetic field 71 such that motion of the reflector 40 in an unintended mode is produced when a current is passed through the electrical conduit 72 in an operational block 712. The operational block 710 further comprises determining the resonant frequency for the unintended mode in an operational block 714.

In certain embodiments, the operational block 712 for aligning the external magnetic field 71 such that motion of the reflector 40 in an unintended mode is produced when a current is passed through the electrical conduit 72 is accomplished using the embodiment schematically illustrated in FIG. 30. As described above, and as illustrated in FIGS. 30 and 31A–D, it is possible to determine the modes in which the reflector 40 is moving by observing the projection of the collimated light beam 638 onto the receiving device 634. Thus, to align the external magnetic field 71 such that motion of the reflector 40 in an unintended mode is produced when a current is passed through the electrical conduit 72, the projection of the collimated light beam 638 onto the receiving device 634 is monitored while an alternating current is passed through the electrical conduit 72. If the projection does not indicate motion of the reflector 40 in an unintended mode, the alignment of the externally-applied magnetic field 71 may be adjusted to produce motion of the reflector 40 in an unintended mode.

In certain embodiments, the operational block 714 for determining the resonant frequency for the unintended mode is also accomplished using the embodiment schematically illustrated in FIG. 30. Varying the frequency of the alternating current electrical signal passed through the electrical conduit 72 can vary the deflection of the collimated light beam 638 at the receiving device 634. The frequency of the electrical signal in the electrical conduit 72 that maximizes the deflection of the collimated light beam 638 at the receiving device 634 is a resonant frequency for an unintended mode. For example, in certain embodiments, the frequency that causes the vertical deflection of the collimated light beam 638 at the receiving device 634 to be maximized corresponds to the resonant frequency for the roll mode 502. Similarly, the frequency that causes the horizontal deflection of the collimated light beam 638 at the receiving device 634 to be maximized corresponds to the resonant frequency for the yaw mode 504.

In alternative embodiments, the operational block 714 for determining the resonant frequency for the unintended mode is accomplished by setting the frequency of the electrical signal passing through the electrical conduit 72 to a resonant frequency that is known in advance to be the resonant frequency for motion in an unintended mode. For example, typical resonant frequencies for motion in the roll mode are between 1100 Hz and 1400 Hz, and typical resonant frequencies for motion in the yaw mode are between 600 Hz and 800 Hz.

Figure 37:
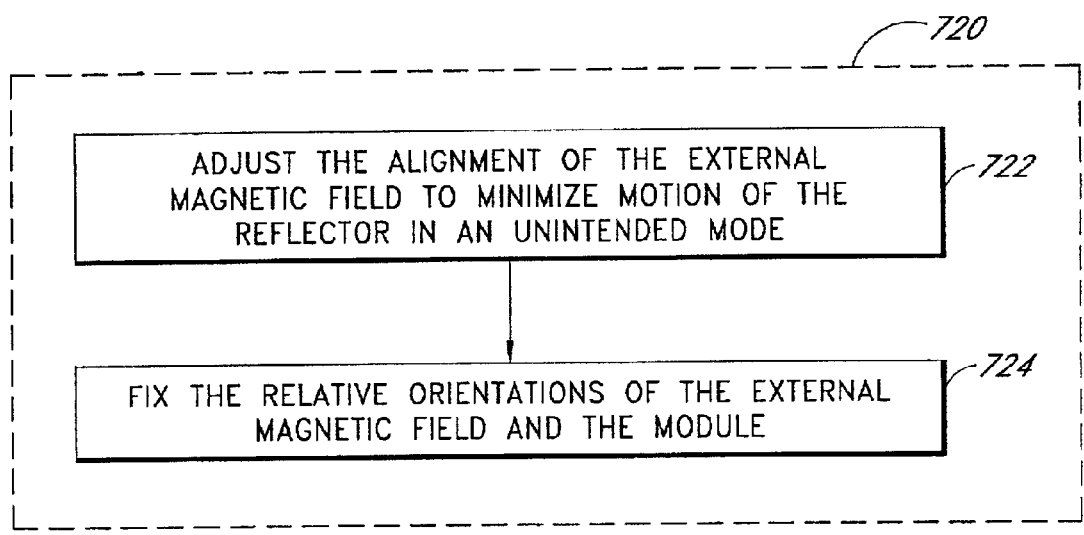
FIG. 37 is a flowchart of one embodiment for adjusting the reflector driver to alter the distribution of forces applied to the reflector such that the movement of the reflector in an unintended mode is reduced.

FIG. 37 is a flowchart corresponding to one embodiment of the operational block 720 for adjusting the reflector driver 60 to alter the distribution of forces applied to the reflector 40 such that motion of the reflector 40 in an unintended mode is reduced. In such embodiments, the operational block 720 comprises adjusting the alignment of the external magnetic field 71 to minimize motion of the reflector 40 in an unintended mode in an operational block 722. The operational block 720 further comprises fixing the relative orientations of the external magnetic field 71 and the module 32 in an operational block 724.

In certain embodiments, the operational block 722 for adjusting the alignment of the external magnetic field 71 to minimize motion of the reflector 40 in an unintended mode is accomplished using the embodiment schematically illustrated in FIG. 30. After the resonant frequency of the unintended mode is determined according to the process described above, an alternating current is passed through the electrical conduit 72 at the resonant frequency of the unintended mode. In certain embodiments in which the alternating current through the electrical conduit 72 is set to the resonant frequency corresponding to motion of the reflector 40 in the roll mode 502, vertical deflection of the collimated light beam 638 at the receiving device 634 can be maximized. Alternatively, in certain embodiments in which the alternating current through the electrical conduit 72 is set to the resonant frequency corresponding to motion of the reflector 40 in the yaw mode 504, horizontal deflection of the collimated light beam 638 at the receiving device 634 can be maximized.

In such embodiments, after maximizing the deflection of the collimated light beam 638 at the receiving device 634 corresponding to motion of the reflector 40 in the unintended mode, the orientation of the externally-applied magnetic field 71 is adjusted. This adjustment can be made to minimize or eliminate the deflection of the collimated light beam 638 at the receiving device 634 corresponding to motion of the reflector 40 in the unintended mode. For example, to reduce motion in the roll mode 502, the externally-applied magnetic field 71 of certain embodiments can be reoriented to minimize deflection of the collimated light beam 638 in the vertical direction at the receiving device 634. Alternatively, to reduce motion in the yaw mode 504, the externally-applied magnetic field 71 of certain embodiments can be reoriented to minimize deflection of the collimated light beam 638 in the horizontal direction at the receiving device 634.

Adjusting the orientation of the externally-applied magnetic field 71 can be accomplished in certain embodiments by physically rotating the magnet 75 used to create the externally-applied magnetic field 71. Such rotation may be performed manually, or it may be performed with the use of mechanical means such as a stepper motor.

Figure 38:
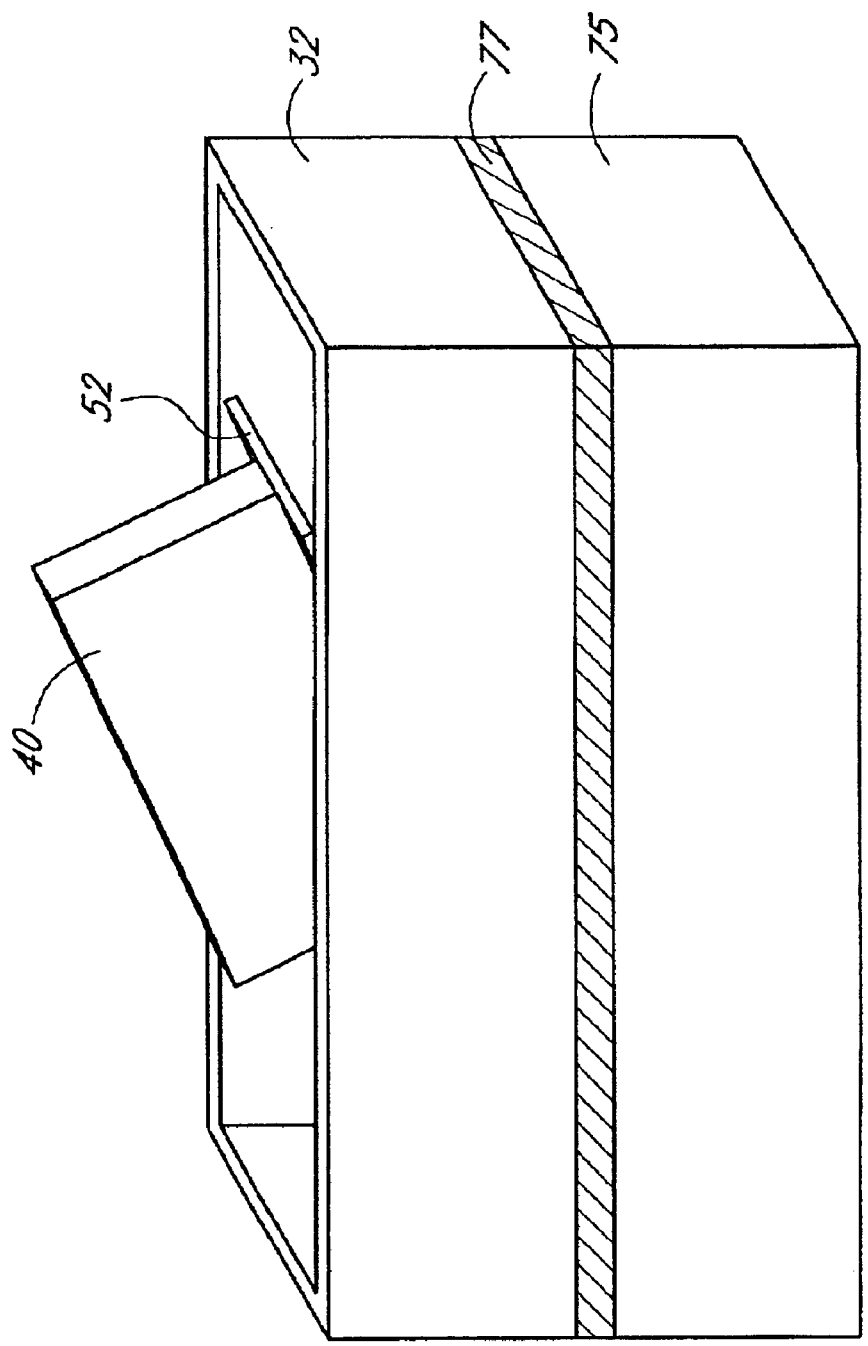
FIG. 38 schematically illustrates one embodiment for fixing the alignment of the external magnetic field and the electrical conduit.

In certain embodiments, the operational block 724 for fixing the relative orientation of the externally-applied magnetic field 71 and the module 32 is accomplished using the embodiment schematically illustrated in FIG. 38. After the externally-applied magnetic filed 71 is aligned to minimize motion of the reflector 40 in one or more unintended modes, the substrate 20 which forms a portion of the module 32 can be physically fixed to the magnet 75 used to produce the external magnetic field 71. As illustrated in FIG. 38, the relative orientation between the magnet 75 and the module 32 may be fixed by spreading an epoxy 77 between the magnet 75 and the substrate 20. Other fastening means, such as a brace, may be used to securably fix the relative orientation between the magnet 75 and the module 32.

Certain embodiments described herein may be used to measure the orientation of an externally-applied magnetic field. For example, the embodiment illustrated in FIG. 30 may be placed within an externally-applied magnetic field to measure the orientation of the magnetic field. In such embodiments, an AC current passes through the electrical conduit 72 on the flap 52, thereby causing the flap 52 and reflector 40 to oscillate. Preferably, the frequency of the AC current passing through the electrical conduit 72 is substantially equal to the resonant frequency corresponding to one of the three modes of motion of the reflector 40 (i.e., pitch, roll, or yaw). A collimated light beam 638 is then reflected from the oscillating reflector 40 onto a receiving device 634. By adjusting the orientation of the module 32 relative to the magnetic field, the projection of the collimated light beam 638 onto the receiving device 634 can be observed to detect when the reflector 40 is aligned with the magnetic field.

For example, when the AC current passing through the electrical conduit 72 is at the resonant frequency for motion in an unintended mode (i.e., the roll mode 502 or the yaw mode 504), the orientation of the module 32 can be adjusted relative to the magnetic field to reduce the motion of the reflector 40 in the unintended mode and to increase the motion of the reflector 40 in the intended mode (i.e., the pitch mode 500). When the projection shown in FIG. 31A appears on the receiving device 634, the reflector 40 has motion only in the pitch mode 500, and therefore the externally-applied magnetic field is then known to be in the $B_x$ direction with respect to the orientation of the module 32, as shown in FIGS. 32A–B. In alternative embodiments, the step of adjusting the orientation of the module 32 to reduce the motion of the reflector 40 in an unintended mode is performed first while the AC current passing through the electrical conduit 72 is at the resonant frequency for one unintended mode, and then while the AC current passing through the electrical conduit 72 is at the resonant frequency for the other unintended mode.

Various embodiments of the present invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A method of reducing movement of a reflector in an unintended mechanical mode during movement of the reflector in an intended mechanical mode, the method comprising:

using a reflector driver to apply a distribution of forces to the reflector so as to move the reflector both in the intended mechanical mode and in the unintended mechanical mode, the distribution of forces applied at a resonant frequency of the unintended mechanical mode; and adjusting the reflector driver to alter the distribution of forces applied to the reflector such that the movement of the reflector in the unintended mechanical mode is reduced.

2. The method of claim 1, wherein adjusting the reflector driver comprises:

reflecting at least a portion of the collimated light beam from the reflector; and detecting a displacement of the reflected portion of the collimated light beam at a distance away from the reflector.

3. The method of claim 2, wherein the displacement of the reflected portion of the collimated light beam is in a line having a length corresponding to the movement of the reflector in the unintended mechanical mode.

4. The method of claim 3, wherein adjusting the reflector driver further comprises minimizing the length of the line.

5. The method of claim 2, wherein the collimated light beam comprises visible light.

6. The method of claim 2, wherein the collimated light beam comprises infrared light.

7. The method of claim 2, wherein detecting the displacement of the reflected portion of the collimated light beam comprises detecting the reflected portion of the collimated light beam with a position-sensitive detector.

8. The method of claim 2, wherein detecting the displacement of the reflected portion of the collimated light beam comprises receiving the reflected portion of the collimated light beam with a charge-coupled-device (CCD) camera.

9. The method of claim 2, wherein detecting the displacement of the reflected portion of the collimated light beam comprises impinging the reflected portion of the collimated light beam onto a screen and visually detecting the displacement of the reflected portion of the collimated light beam.

10. The method of claim 1, wherein the reflector driver comprises an electrical conduit coupled to a source of electrical current flowing through the electrical conduit, and the distribution of forces is generated by the electrical current interacting with a magnetic field.

11. The method of claim 10, wherein the magnetic field is generated by a magnet and adjusting the reflector driver comprises adjusting a relative orientation between the magnet and the electrical conduit.

12. The method of claim 11, wherein the magnet comprises a permanent magnet.

13. The method of claim 11, wherein the magnet comprises an electromagnet.

14. The method of claim 11, wherein the method further comprises fixing the relative orientation between the magnet and the electrical conduit.

15. The method of claim 1, wherein applying the distribution of forces at the resonant frequency of the unintended mechanical mode further comprises determining the resonant frequency.

16. The method of claim 15, wherein determining the resonant frequency of the unintended mechanical mode comprises:

applying the distribution of forces to the reflector so as to move the reflector in the unintended mechanical mode, the distribution of forces applied at a frequency;

detecting the movement of the reflector in the unintended mechanical mode; and adjusting the frequency so as to maximize, with respect to the frequency, the movement of the reflector in the unintended mechanical mode.

17. The method of claim 16, wherein detecting the movement of the reflector in the unintended mechanical mode comprises:

reflecting at least a portion of the collimated light beam from the reflector; and detecting a displacement of the reflected portion of the collimated light beam at a distance away from the reflector.

18. The method of claim 1, wherein the reflector and reflector driver comprise a microelectromechanical system.

19. The method of claim 1, wherein the movement of the reflector in the intended mechanical mode is oscillatory about a predetermined point within a range of motion of the reflector.

* * * * *